US009710806B2

(12) United States Patent
Kenyon et al.

(10) Patent No.: US 9,710,806 B2
(45) Date of Patent: Jul. 18, 2017

(54) SYSTEMS AND METHODS FOR ELECTRONIC PAYMENT INSTRUMENT REPOSITORY

(71) Applicant: FISERV, INC., Brookfield, WI (US)

(72) Inventors: Leah Phillips Kenyon, Irving, TX (US); Todd Christopher Barlok, Trussville, AL (US); Timothy Patrick Sheehan, Decatur, GA (US)

(73) Assignee: Fiserv, Inc., Brookfield, WI (US)

( * ) Notice: Subject to any disclaimer, the term of this patent is extended or adjusted under 35 U.S.C. 154(b) by 0 days.

(21) Appl. No.: 13/779,315

(22) Filed: Feb. 27, 2013

(65) Prior Publication Data

US 2014/0244493 A1    Aug. 28, 2014

(51) Int. Cl.
*G06Q 40/00*    (2012.01)
*G06Q 20/36*    (2012.01)

(52) U.S. Cl.
CPC .................................... *G06Q 20/36* (2013.01)

(58) Field of Classification Search
CPC ...... G06Q 40/00; G06Q 20/10; G06Q 20/102; G06Q 20/382; G06Q 20/367; G06Q 20/3672; G06Q 20/3674; G06Q 20/401; G06Q 20/27
USPC ................. 705/35, 39, 40, 64–67, 73, 75, 79
See application file for complete search history.

(56) References Cited

U.S. PATENT DOCUMENTS

| | | | |
|---|---|---|---|
| 4,570,156 A | 2/1986 | Nicholas, Jr. | |
| 4,949,392 A | 8/1990 | Barski et al. | |
| 5,258,855 A | 11/1993 | Lech et al. | |
| 5,369,508 A | 11/1994 | Lech et al. | |
| 5,469,241 A | 11/1995 | Takahashi et al. | |
| 5,555,325 A | 9/1996 | Burger | |
| 5,604,343 A | 2/1997 | Curry et al. | |
| 5,625,465 A | 4/1997 | Lech et al. | |
| 5,748,740 A | 5/1998 | Curry et al. | |
| 5,760,385 A | 6/1998 | Curry et al. | |
| 5,768,416 A | 6/1998 | Lech et al. | |
| 5,805,702 A | 9/1998 | Curry et al. | |
| 5,832,207 A | 11/1998 | Little et al. | |

(Continued)

FOREIGN PATENT DOCUMENTS

WO        0225575        3/2002

OTHER PUBLICATIONS

Neat Receipts Mobile Scanner+ Digital Filing System Software—Portable Receipt Scanner, Business Card Scanner, and Document Scanner; http://www.yourofficestop.com/net-receipts-compact-portable-receipt-scanner.html; last accessed Jun. 18, 2010.

(Continued)

*Primary Examiner* — Lalita M Hamilton
(74) *Attorney, Agent, or Firm* — Alston & Bird LLP

(57) ABSTRACT

Systems and methods that receive one or more images and based at least in part on the received images, identify information associated with a payment instrument. The information associated with the payment instrument may be stored in a payment instrument repository, such as an electronic wallet (eWallet), associated with a user. The eWallet may be accessed by the user to add, delete, or modify payment instruments and associated information in the eWallet. The eWallet may further be used by the use to initiate a financial transaction using one or more of the payment instruments associated with the eWallet.

30 Claims, 9 Drawing Sheets

(56) References Cited

U.S. PATENT DOCUMENTS

| | | |
|---|---|---|
| 5,881,172 A | 3/1999 | Pintsov |
| 5,883,810 A | 3/1999 | Franklin et al. |
| 5,940,510 A | 8/1999 | Curry et al. |
| 5,949,880 A | 9/1999 | Curry et al. |
| 6,021,494 A | 2/2000 | Bolan et al. |
| 6,064,740 A | 5/2000 | Curiger et al. |
| 6,105,013 A | 8/2000 | Curry et al. |
| 6,219,789 B1 | 4/2001 | Little et al. |
| 6,237,095 B1 | 5/2001 | Curry et al. |
| 6,363,381 B1 | 3/2002 | Lee et al. |
| 6,741,737 B1 | 5/2004 | Lenoir |
| 6,823,084 B2 | 11/2004 | Myers et al. |
| 6,873,974 B1 | 3/2005 | Schutzer |
| 7,031,553 B2 | 4/2006 | Myers et al. |
| 7,069,240 B2 | 6/2006 | Spero et al. |
| 7,089,208 B1 | 8/2006 | Levchin et al. |
| 7,168,614 B2 | 1/2007 | Kotovich et al. |
| 7,171,046 B2 | 1/2007 | Myers et al. |
| 7,201,323 B2 | 4/2007 | Kotovich et al. |
| 7,249,717 B2 | 7/2007 | Kotovich et al. |
| 7,264,163 B2 | 9/2007 | Heilper et al. |
| 7,286,718 B2 | 10/2007 | Aradhye |
| 7,333,676 B2 | 2/2008 | Myers et al. |
| 7,337,144 B1 | 2/2008 | Blinn et al. |
| 7,343,496 B1 | 3/2008 | Hsiang et al. |
| 7,349,884 B1 | 3/2008 | Odom et al. |
| 7,395,242 B2 | 7/2008 | Blinn et al. |
| 7,398,250 B2 | 7/2008 | Blinn et al. |
| 7,430,310 B2 | 9/2008 | Kotovich et al. |
| 7,433,845 B1 | 10/2008 | Flitcroft et al. |
| 7,475,043 B2 | 1/2009 | Light et al. |
| 7,529,563 B1* | 5/2009 | Pitroda .......................... 455/558 |
| 7,548,885 B2 | 6/2009 | Dutta et al. |
| 7,606,760 B2 | 10/2009 | Hutchison et al. |
| 7,620,268 B2 | 11/2009 | Myers et al. |
| 7,657,120 B2 | 2/2010 | Aradhye |
| 7,698,221 B2 | 4/2010 | Blinn et al. |
| 7,708,194 B2 | 5/2010 | Vawter |
| 7,708,198 B2* | 5/2010 | Gangi ........................... 235/380 |
| 7,738,706 B2 | 6/2010 | Aradhye et al. |
| 7,739,194 B2 | 6/2010 | Blinn et al. |
| 7,778,457 B2 | 8/2010 | Nepomniachtchi |
| 7,783,135 B2 | 8/2010 | Gokturk et al. |
| 7,895,122 B2 | 2/2011 | Flitcroft et al. |
| 7,949,176 B2 | 5/2011 | Nepomniachtchi |
| 7,953,268 B2 | 5/2011 | Nepomniachtchi |
| 7,978,900 B2 | 7/2011 | Nepomniachtchi |
| 7,995,118 B2 | 8/2011 | Rothschild |
| 7,996,268 B2 | 8/2011 | Poltorak |
| 8,000,514 B2 | 8/2011 | Nepomniachtchi et al. |
| 8,060,413 B2 | 11/2011 | Castell et al. |
| 8,139,900 B2 | 3/2012 | Gokturk et al. |
| 8,161,125 B2* | 4/2012 | Pearson et al. ............... 709/206 |
| 8,162,125 B1 | 4/2012 | Csulits et al. |
| 8,165,958 B1 | 4/2012 | McLaughlin et al. |
| 8,261,978 B2* | 9/2012 | Gangi ........................... 235/380 |
| 8,326,015 B2 | 12/2012 | Nepomniachtchi et al. |
| 8,391,583 B1 | 3/2013 | Mennie et al. |
| 8,543,501 B2 | 9/2013 | Lawson et al. |
| 8,635,155 B2 | 1/2014 | Lawson et al. |
| 8,897,565 B1 | 11/2014 | Palm et al. |
| 2001/0034725 A1 | 10/2001 | Park et al. |
| 2001/0051915 A1 | 12/2001 | Ueno et al. |
| 2002/0042776 A1 | 4/2002 | Woo et al. |
| 2002/0065774 A1 | 5/2002 | Young et al. |
| 2002/0131636 A1 | 9/2002 | Hou |
| 2002/0145035 A1 | 10/2002 | Jones |
| 2003/0059098 A1 | 3/2003 | Jones et al. |
| 2003/0089780 A1 | 5/2003 | Goodyear et al. |
| 2003/0177090 A1 | 9/2003 | Eden |
| 2004/0057581 A1 | 3/2004 | Rhoads |
| 2004/0068467 A1 | 4/2004 | Toda |
| 2004/0153408 A1 | 8/2004 | Jones et al. |
| 2004/0154964 A1 | 8/2004 | Jones |
| 2004/0247168 A1 | 12/2004 | Pintsov |
| 2004/0254891 A1 | 12/2004 | Blinn et al. |
| 2005/0033690 A1 | 2/2005 | Antognini et al. |
| 2005/0052672 A1 | 3/2005 | Talluri et al. |
| 2005/0065893 A1 | 3/2005 | Josephson |
| 2005/0097019 A1 | 5/2005 | Jacobs |
| 2005/0103687 A1 | 5/2005 | DeWitt et al. |
| 2005/0185225 A1 | 8/2005 | Brawn et al. |
| 2005/0210048 A1 | 9/2005 | Beres et al. |
| 2005/0231746 A1 | 10/2005 | Parry et al. |
| 2006/0089907 A1 | 4/2006 | Kohlmaier et al. |
| 2006/0124727 A1 | 6/2006 | Kotovich et al. |
| 2006/0235758 A1 | 10/2006 | Schleicher |
| 2007/0033118 A1 | 2/2007 | Hopkinson |
| 2007/0041642 A1 | 2/2007 | Romanoff et al. |
| 2007/0094296 A1 | 4/2007 | Peters |
| 2007/0118391 A1 | 5/2007 | Malaney et al. |
| 2007/0205261 A1 | 9/2007 | Postnikov et al. |
| 2007/0271183 A1 | 11/2007 | Foth |
| 2007/0280511 A1 | 12/2007 | Nepomniachtchi et al. |
| 2007/0297340 A1 | 12/2007 | Maes |
| 2008/0016003 A1 | 1/2008 | Hutchison et al. |
| 2008/0086421 A1 | 4/2008 | Gilder et al. |
| 2008/0109355 A1 | 5/2008 | Dutta et al. |
| 2008/0118110 A1 | 5/2008 | Simonsson |
| 2008/0141117 A1 | 6/2008 | King et al. |
| 2008/0147561 A1 | 6/2008 | Euchner et al. |
| 2008/0152209 A1 | 6/2008 | Kosek et al. |
| 2008/0189208 A1 | 8/2008 | Wilkie |
| 2008/0218812 A1 | 9/2008 | Wolf |
| 2008/0267505 A1 | 10/2008 | Dabet et al. |
| 2008/0319873 A1 | 12/2008 | Levchin et al. |
| 2009/0067729 A1 | 3/2009 | Turkelson et al. |
| 2009/0092317 A1 | 4/2009 | Nagarajan et al. |
| 2009/0119205 A1 | 5/2009 | Keresman et al. |
| 2009/0119324 A1 | 5/2009 | Simard et al. |
| 2009/0119574 A1 | 5/2009 | Gitlin et al. |
| 2009/0156180 A1* | 6/2009 | Slavin et al. ............... 455/414.1 |
| 2009/0185241 A1 | 7/2009 | Nepomniachtchi |
| 2009/0185736 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0204530 A1 | 8/2009 | Hanson |
| 2010/0063906 A1* | 3/2010 | Nelsen et al. .................. 705/30 |
| 2010/0223276 A1 | 9/2010 | Al-Shameri et al. |
| 2011/0091092 A1 | 4/2011 | Nepomniachtchi et al. |
| 2011/0145049 A1* | 6/2011 | Hertel et al. ............... 705/14.23 |
| 2011/0194750 A1 | 8/2011 | Nepomniachtchi |
| 2011/0280450 A1 | 11/2011 | Nepomniachtchi et al. |
| 2011/0313918 A1 | 12/2011 | Lawson |
| 2012/0123935 A1* | 5/2012 | Brudnicki et al. .............. 705/41 |
| 2012/0205904 A1 | 8/2012 | Tredeau et al. |
| 2012/0226600 A1 | 9/2012 | Dolev |
| 2012/0310760 A1* | 12/2012 | Phillips et al. ............. 705/26.1 |
| 2013/0024371 A1* | 1/2013 | Hariramani et al. ........... 705/41 |
| 2013/0094751 A1 | 4/2013 | Nepomniachtchi et al. |
| 2013/0204840 A1 | 8/2013 | Jarvis et al. |
| 2014/0037183 A1 | 2/2014 | Gorski et al. |
| 2014/0114851 A1 | 4/2014 | Lawson et al. |
| 2014/0146200 A1 | 5/2014 | Scott et al. |
| 2014/0153787 A1 | 6/2014 | Schmidtler et al. |
| 2014/0244493 A1 | 8/2014 | Kenyon et al. |
| 2014/0258838 A1 | 9/2014 | Evers et al. |
| 2014/0279303 A1 | 9/2014 | van Dam et al. |
| 2014/0334731 A1 | 11/2014 | Tripathi et al. |
| 2015/0227904 A1 | 8/2015 | Lawson et al. |

OTHER PUBLICATIONS

Appletell reviews ProOnGo Expense for iPhone; http://www.appletell.com/apple/commentfappletell-reviews-proongo-expense-for-iphone/; last accessed Jun. 18, 2010.

Receipt Reader Turns Your Smartphone Camera Into a Receipt Scanner; http:I/blogs.bnet.com/businesstips/?p=3898; last accessed Jun. 18, 2010.

ProOnGo—Mobile Expense Reporting; http:I/www.proongo.com; last accessed Jun. 18, 2010.

The Neat Company—NeatReceipts; http:I/www.neatco.com/products/neatreceipts; last accessed Jun. 18, 2010.

(56) References Cited

OTHER PUBLICATIONS

Scan and Pay Services: The Future of Electronic Bill Presentment; http:I/reports.celent.com/PressReleases/20000524/lockbox.htm; last accessed Jun. 18, 2010.
Paytrust® Online Bill Pay, Bill Payment Service, Pay My Bills, Pay Bills Online; http:I/paytrust.com/compare-paytrust-online-bill-pay-services.shtml; last accessed Jun. 18, 2010.
CyberBills Pioneers TOTAL Web-based Bill Management (NetBanker); http:I/www.netbanker.com/1999/03/cyberbills_pioneers_total_webb.html; last accessed Jun. 18, 2010.
The Consumer Capture Opportunity—Here we go again?, presented by Celent; http:I/www.remotedepositcapture.com/files/Webinars/RDC%20Consumer%20Capture.pdf; last accessed Jun. 18, 2010.
Consumer Source Capture; http ://www.checkfreesoftware. com/cda/software/L5 .jsp?layoutId=51629&contentId=51624&menuId=51633&pId=60524; last accessed Jun. 18, 2010.
Best Practices Guide: Consumer Capture {Fiserv); http://www.sco.fiserv.com/ContentDocumentHandler.ashx?documentId=3022; last accessed Jun. 18, 2010.
Lubinski, R. G. (2009). Power up energy savings with a utility database. Buildings, 103(9), 26. Retrieved Jun. 19, 2013.
Lemon Wallet; http://www.lemon.com; last accessed Jun. 27, 2013.
Daniel Wolfe, Flint Brings Its Mobile-Pay App to the iPhone App Store, PaymentsSource, Nov. 16, 2012.
Flint, L. (2003). Pay it forward. Today, 25(5), 20-22. Retrieved Mar. 14, 2013.
Non-Final Office Action for related U.S. Appl. No. 12/818,964 mailed Nov. 18, 2011.
Non-Final Office Action for related U.S. Appl. No. 12/818,961 mailed Mar. 16, 2012.
Final Office Action for related U.S. Appl. No. 12/818,964 mailed Apr. 13, 2012.
Non-Final Office Action for related U.S. Appl. No. 12/818,961 mailed Oct. 16, 2012.
Non-Final Office Action for related U.S. Appl. No. 12/818,964 mailed Apr. 19, 2013.
Notice of Allowance for related U.S. Appl. No. 12/818,961 mailed Jun. 21, 2013.
Notice of Allowance for related U.S. Appl. No. 12/818,964 mailed Sep. 5, 2013.
Fiserv: Form Definition Editor V1.9—User's Guide; Sep. 15, 2009.
NeXGen® Remittance—General Information Manual; Mar. 10, 2013.
Non-Final Office Action for U.S. Appl. No. 14/145,487 mailed Aug. 8, 2014.
Restriction Requirement for U.S. Appl. No. 13/844,039 mailed Feb. 24, 2015.
Non-Final Office Action for U.S. Appl. No. 13/844,039 mailed Jun. 1, 2015.
Non-Final Office Action for U.S. Appl. No. 14/590,767 mailed Nov. 5, 2015.
Non-Final Office Action for U.S. Appl. No. 13/844,039 mailed Dec. 16, 2015.

* cited by examiner

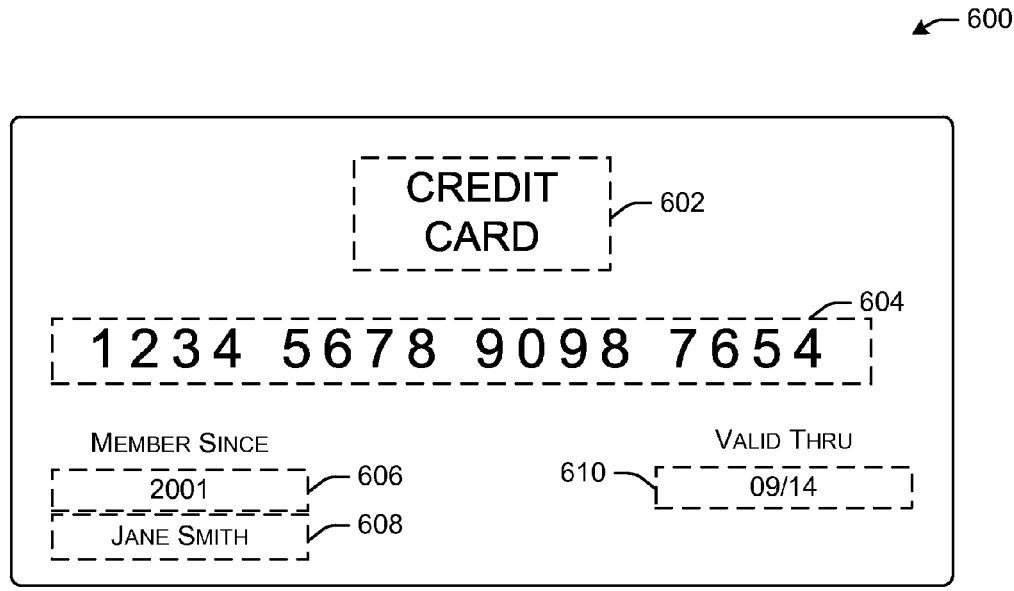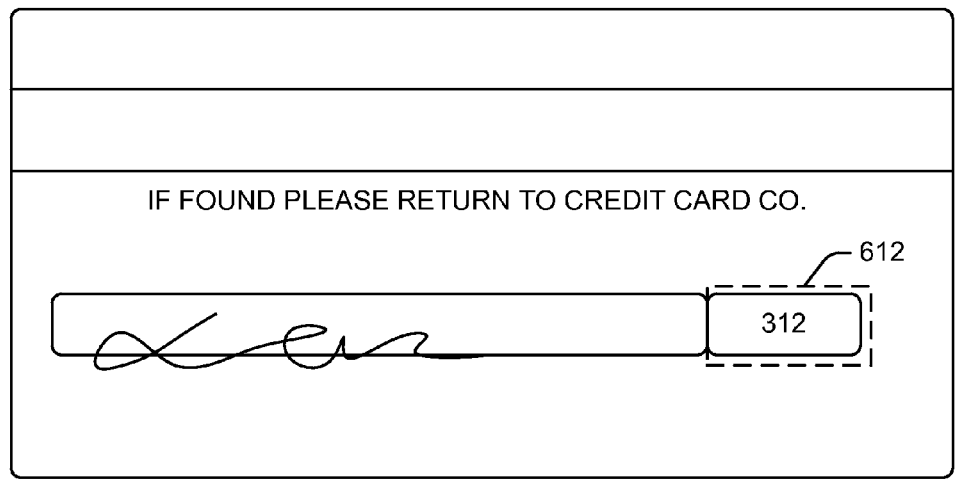
FIG. 6

ADD A PAYMENT INSTRUMENT TO YOUR eWALLET — 802

800

804 — THANK YOU FOR CONFIRMING PAYMENT INSTRUMENT DATA ELEMENTS.

806 — PLEASE PROVIDE ADDITIONAL INFORMATION FOR THIS ACCOUNT:

808 — ACCOUNT NICKNAME — MOM'S ACCOUNT — 820

810 — SPENDING LIMIT — $250.00 — 824

812 — AUTHORIZED ACCOUNT E-MAIL — MOM@DOMAIN.COM — 826

814 — AUTHORIZED ACCOUNT PHONE NUMBER — 555-555-5555 — 828

830 — *IF YOU ARE NOT THE HOLDER OF THIS ACCOUNT, THE ACCOUNT HOLDER WILL BE ASKED TO VERIFY OUR ACCESS TO THE ACCOUNT IN ACCORDANCE WITH THE TERMS AND CONDITIONS OF eWALLET.

SUBMIT — 840

FIG. 8

SYSTEMS AND METHODS FOR ELECTRONIC PAYMENT INSTRUMENT REPOSITORY

FIELD OF THE DISCLOSURE

The present disclosure generally relates to systems and methods for electronic payment instruments and particularly to a repository for electronic payment instrument information.

BACKGROUND OF THE DISCLOSURE

There are currently financial systems, known as "electronic wallets," that store financial account information on behalf of a user to facilitate financial transactions in one or more online applications. Typically when these systems are used, information associated with a financial instrument linked to a funding account, such as a credit card or a check, is entered by the user.

BRIEF DESCRIPTION OF THE FIGURES

Reference will now be made to the accompanying drawings, which are not necessarily drawn to scale, and wherein:

FIG. 6 is a schematic representation of another example image of a payment instrument with payment instrument data elements in accordance with illustrative embodiments of the disclosure.

FIG. 8 is a schematic representation of an example user interface for providing parameters associated with a payment instrument to the eWallet account in accordance with illustrative embodiments of the disclosure.

DETAILED DESCRIPTION OF EMBODIMENTS OF THE DISCLOSURE

Figure 1:
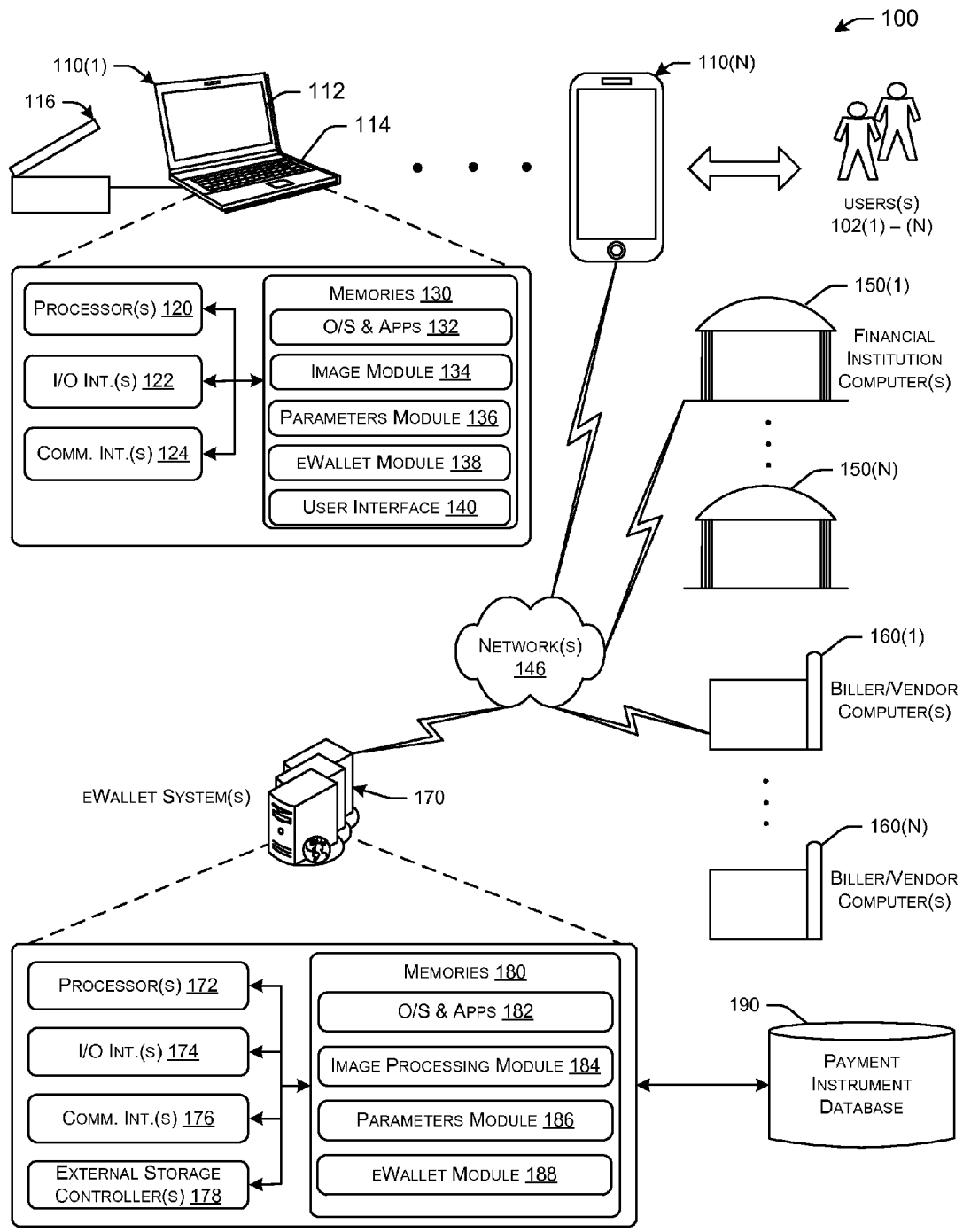
FIG. 1 is a simplified schematic diagram illustrating an example architecture for a payment instrument repository in accordance with illustrative embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Embodiments of the disclosure may provide systems and methods for a repository of electronic payment instrument data, such as a financial system. The repository of electronic payment instrument data or financial system may be in the form of an electronic wallet (eWallet). A particular user may access his/her eWallet via electronic communicative connections, such as the Internet. The user's eWallet may have stored thereon electronic data elements associated with one or more payment instruments that may be selected by the user to make a payment or other financial transaction. Each of the one or more payment instruments may be linked to one or more financial accounts that may be accessed to instantiate the payment. For example, a particular user's eWallet may include a first payment instrument in the form of a credit card associated with a credit card account, a second payment instrument in the form of a debit card associated with a savings account, and a check associated with a checking account. The user may select one or more of the payment instruments (credit card, debit card, and/or check) to make a payment from the corresponding financial account. In certain embodiments, the user's eWallet may be associated with a particular vendor and/or biller and may be used with a relatively limited number of vendors and/or billers. For example, the eWallet may be captive to a particular online retailer and may not be available for use with other retailers. In other embodiments, the user's eWallet may be available for use with a relatively large number of vendors, billers, and/or retailers. In these embodiments, the user's eWallet account may be managed and/or hosted by a third party entity providing the financial service that may be accessed by the user or a vendor to make or accept a payment, respectively. In some cases, the eWallet may be used only for instantiating financial transactions through the associated third party entity, whereas in other cases the third party entity may facilitate use of eWallet content in payments initiated at a variety of other online sites. While the electronic payment repository system is referred to as an eWallet system, it may be understood that this system may include a variety of additional functionality associated with electronic payments and may be appropriately named. For example, the systems described herein may include both electronic payment data repository functionality along with electronic bill and/or purchase payment functionality and may, therefore, be referred to as a financial transaction system.

Embodiments of the disclosure may further provide systems and methods to create, modify, and/or edit a repository of electronic payment data, in the form of the eWallet. In one aspect, a user may be able to create an eWallet account by interacting with one or more computers that may host eWallet accounts. In another aspect, a user may be able to add or delete one or more payment instruments from an eWallet account by interacting with the one or more computers that may host eWallet accounts. In yet another aspect, a user may be able to edit one or more data elements associated with one or more payment instruments associated with the user's eWallet account. These one or more computers may provide the eWallet as a financial service and may be associated with and/or provided by a vendor, a biller, a financial institution, and/or a third party financial service provider. In certain embodiments, a user may have an eWallet account with payment instruments and/or associated financial accounts that are owned by that user or otherwise in sole control of that user. In other embodiments, the user may have an eWallet account with one or more payment instruments that may be owned by and/or at least partially controlled by another individual. For example, a child may have access to one or more of his/her parent's credit card accounts. In this case, one or more parties that control or are otherwise fiducially responsible for payments made using the payment instruments may agree to the use of those payment instruments by another party as part of the eWallet. In certain embodiments, the eWallet system may be configured to receive and/or solicit authorization from one or more parties that may at least partially control a particular payment instrument or are otherwise at least partially fiducially responsible for the particular payment instrument.

The systems and methods disclosed herein may further receive one or more images, such as an image of a payment instrument and based at least in part on the received image(s) identify information associated with the payment instrument. The payment instrument information may then be stored in a suitable eWallet account associated with a user authorized to use the payment instrument. Therefore, the creation and/or modification of the eWallet may entail determining one or more payment instrument data elements from an image of at least a portion of a payment instrument. The determination of payment instrument data elements may further entail presentation of preliminary payment instrument data elements ascertained from the received one or more images of at least a portion of a payment instrument to the user associated with the eWallet account. The presentation of the preliminary payment instrument data elements may be via a user device associated with the user. The eWallet systems may further be configured to receive authorization and/or confirmation of the preliminary payment instrument data elements. Upon confirmation of the preliminary payment instrument data elements, the payment instrument data elements may be used to update the eWallet account associated with the user. Alternatively, if the user wishes to change any of the preliminary payment instrument data elements, he/she may do so by interacting with the eWallet system, such as via one or more user devices and communicative links to the eWallet system. The user may provide updates and/or edits to one or more of the preliminary payment instrument data elements as determined from the one or more images of the payment instrument, or portions thereof.

The payment instrument image may be captured by any suitable entity, such as the user of the eWallet system, that owns and/or is responsible for the payment instrument, and/or the financial institution and/or other entity associated with the payment instrument. In certain embodiments of the disclosure, the payment instrument image may be captured by the user using a user device, such as a computing device and/or computer peripheral driving an image scanner, image sensor, and/or camera. Thus, the user device may be configured to capture the payment instrument image, independently or in conjunction with other entities or other hardware and/or software elements. In these embodiments, the user device may be used to capture an image of the payment instrument in paper form using any suitable image capture device, such as a scanner, image sensor, camera, or the like. In certain other embodiments, the user device may be configured to receive the payment instrument image from the memory of the user device or any other suitable entity, such as a remote and/or cloud server, in digital form via the Internet or other communicative links. A form or instructions may be provided for performing the image capture process and then present the captured image and/or extracted elements in a subsequent presentation. The payment instrument image may include any one or more of an image of a front of a check, a front of a card, such as a credit, debit, or prepaid card, or a back of a card, such as a credit, debit, or prepaid card. The user device may be further configured to transmit the payment instrument image to the eWallet system for image processing and extraction of one or more payment instrument data elements. In other embodiments, at least a portion of the image processing and extraction of one or more payment instrument data elements may be performed on the user device. In certain further embodiments, the user device may be configured to receive the payment instrument image from the financial institution with which the payment instrument is affiliated or any other suitable entity, such as in digital form via the Internet. The user device may be further configured to transmit the payment instrument image or any extracted payment instrument data elements to the eWallet system for further processing or storage.

The user device may include one or more processor(s) and one or more memories with instructions and/or applications stored thereon that may enable the user device to perform a variety of image capture, image processing, image and/or data processing, image and/or data communications, and/or user interaction functions. In certain embodiments, the user device may interact with a web based application served by one or more servers to provide the aforementioned functionality. In these embodiments, the instructions and/or application may not be stored on the user device and instead may be interacted with by the user via a user interface (UI) rendered on the user device, using one or more applications on the user device, such as a web browser. The user device and the processor(s) thereon may execute one or more payment instrument applications to perform the functions as described herein. The user device, image capture component (e.g., a scanner, which may be part of a printer), and user application functionality supporting this processing, whether on the user device or at a remote computer, together may comprise a payment instrument application system.

The eWallet system may utilize a variety of techniques to process and/or analyze the payment instrument image received from the user device on behalf of the user. These techniques may involve image improvement techniques, such as image sharpening, image reorienting, or the like. The techniques may further involve mechanisms for identifying payment instrument image fields, text, and/or images, such as optical character recognition (OCR). The eWallet system may identify one or more fields or textual indicators on the payment instrument image to determine one or more payment instrument data elements. The eWallet system may, therefore, include one or more processor(s) and one or more memories with instructions and/or applications stored thereon that may enable the user device to perform a variety of image capture functionality, image processing, image and/or data processing, image and/or data communications, and/or user interaction functions. Upon identifying the one or more payment instrument elements, the eWallet system may communicate the one or more payment instrument data elements, or an indication thereof, to the user device. It will be appreciated that in certain embodiments, some or all of the process of identifying the payment instrument data elements may be performed at the user device. For example, image improvement techniques, such as image sharpening, may be performed at the user device and payment instrument image field identification may be performed at the payment system.

The user device upon receiving the one or more payment instrument data elements may present the payment instrument data elements to the user by any suitable mechanism, such as rendering the one or more payment instrument data elements on a display screen. The user device may further solicit a response from the user indicative of either approval of the one or more payment instrument data elements or an indication of at least one of the one or more payment instrument data elements that should be modified. The user, therefore, may be able to modify the one or more payment instrument data elements, such as by changing the payment amount or payment date. Once the user provides approval or a final set of one or more approved payment instrument data elements to the user device, the user device may transmit the one or more approved payment instrument data elements, or an indication thereof, to the payment system.

Referring now to FIG. 1, example architecture 100 for electronic payment data repository in accordance with embodiments of the disclosure is disclosed. The architecture 100 may include one or more users 102(1)-(N), collectively referred to as users 102, that can access a corresponding user device 110(1)-(N), collectively referred to as user device 110. The user devices 110 may be configured to communicate via one or more networks 146 or other suitable communicative connections. The architecture 100 may further include one or more financial institution computers 150(1)-(N), collectively referred to as financial institution computers 150, and one or more vendor/vendor/biller computers 160(1)-(N), collectively referred to as vendors/vendor/biller computers 160. The financial institution computers 150 and the vendor/biller computers 160 may be configured to communicate via the networks 146 or other suitable communicative connections. The architecture 100 may yet further include one or more electronic payment data repository systems 170, also referred to as eWallet systems 170, configured to communicate via the networks 146 or other suitable communicative connections.

The users 102 may be individuals or other entities, such as corporations, non-profit organizations, for-profit organizations, government organizations, public sector organizations, or any of the aforementioned entities located in this or foreign countries. The user devices 110 may be any suitable electronic device that may be used by a user 102 to interact with services provided by the user device 110 or other entities of the architecture 100. The user device 110 may include, but is not limited to, a personal computer, a desktop computer, a notebook computer, a laptop computer, a personal digital assistant, an electronic book (ebook) reader, a tablet computing device, a pad computing device, a smart phone, or combinations thereof. The user device 110 may include one or more input and/or output (I/O) components, such as one or more display(s) 112, one or more keyboard(s) 114, and/or one or more image scanner(s) 116. Other examples of I/O components of a user device 110 may include one or more, pointing device(s), microphone(s), accelerometer(s), gyroscope(s), touch sensitive screen(s), electronic storage device(s), one or more mice, or the like. Each of these I/O components 112, 114, 116 may be configured to provide a functionality by the user device 110 such as ability to render information to the user 102, such as with the display 112, accept information from the user 102, ability to accept input from the user 102, such as with the keyboard 114, or sensing an image, such as with the image scanner 116. The I/O components 112, 114, 116 may be configured to provide signal(s), such as an input and/or output signal, associated with the I/O component. For example, the image scanner 116 may provide an image sensor signal corresponding to an image captured by the image scanner 116.

The image scanner 116 may be any known scanning device, or otherwise a device that may generate an image from a document, including, but not limited to, a flatbed scanner, a handheld scanner, a combination scanner/copier, a combination scanner/facsimile machine, or the like. The image scanner 116, in certain embodiments, may include any known variety of image sensors, including a charge coupled device (CCD), complementary metal oxide semiconductor (CMOS) sensors, or the like. The image scanner 116 may further be of any pixel count and aspect ratio. While the image scanner 116 is depicted as a digital flatbed scanner communicatively coupled to the user device 110, it will be appreciated that the image scanner 116 may alternatively be in to the form of a digital camera, a web camera, a smart phone or tablet computer camera, or the like.

The user devices 110 may include one or more processors 120, one or more input/output (I/O) interfaces 122, one or more communications interfaces 124, and/or one or more memories 130. It will be appreciated that the user devices 110 may include other components or elements that enable the user devices 110 to perform the methods and processes described herein in accordance with embodiments of the disclosure.

The one or more processors 120 may be configured to execute and/or operate one or more instructions, applications, and/or software in one or more memories 130 of the user device 110 to provide services to the users 102 associated with the user device 110. The processors 120 may further be configured to receive input from or provide output to the components 112, 114, 116 and other components, of the user device 110. For example, the processors 120 may be configured to direct the operation of the image scanner 116 and/or receive an image sensor signal and/or image sensor data associated with an image captured using the image scanner 116.

In some examples, the one or more processors 120 of the user device 110 may be implemented as appropriate in hardware, software, firmware, or combinations thereof. Software or firmware implementations of the one or more processors 120 may include computer-executable or machine-executable instructions written in any suitable programming language to perform the various functions described. Hardware implementations of the processors 120 may be configured to execute computer-executable or machine-executable instructions to perform the various functions described. The one or more processors 120 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 110 may also include a chipset (not shown) for controlling communications between the one or more processors 120 and one or more of the other components of the user device 110. The one or more processors 120 may also include one or more application specific integrated circuits (ASICs) or application specific standard products (ASSPs) for handling specific data processing functions or tasks.

The I/O interfaces(s) 122, may include any suitable interface configured to interface between the processors 120 and the components 112, 114, 116 of the user device 110. The communications interfaces(s) 124 may allow the user devices 110 to communicate with stored databases, other computing devices or servers, user terminals, and/or other devices on the networks 146 or other suitable communicative channels.

The memory 130 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 130 may store program instructions that are loadable and executable on the processor(s) 120, as well as data generated or received during the execution of these programs. Turning to the contents of the memory 130 in more detail, the memory 130 may include an operating system (O/S) and/or applications 132, an image module 134, parameters module 136, an eWallet module 138 and/or a user interface module 140. Each of the modules and/or software may provide functionality for the user device 110, when executed by the processors 120. The modules and/or the software may or may not correspond to physical locations and/or addresses in memory 130. In other words, the contents of each of the modules may not be segregated from each other and may, in fact be stored in at least partially interleaved positions on the memory 130. In certain embodiments, each of the modules 132, 134, 136, 138, 140 may be divided with greater granularity. In other words, each of the modules 132, 134, 136, 138, 140 may include sub-modules. For example, individual applications within the O/S and/or application module 132 may be sub-modules of the O/S and/or application module 132.

The O/S and/or applications 132 may have one or more operating systems, as well as third-party applications, system tools, and libraries, stored thereon. The processors 120 may be configured to access and execute one or more operating systems stored in the O/S and applications module 120 to operate the system functions of the user devices 110. System functions, as managed by the O/S may include memory management, processor resource management, driver management, application software management, system configuration, and the like. The O/S may be any variety of suitable operating systems including, but not limited to, Google® Android®, Microsoft® Windows®, Microsoft® Windows® Server®, Linux, Apple® OS-X®, Apple® iOS®, or the like. The O/S and applications module 132 may additionally have one or more software applications stored thereon that may be accessed and executed by the processors 120 to provide user device 110 functionality and services to the user 102 using the user device 110.

The image module 134 may have stored thereon instruction and/or programs that when executed by the processors 120, may enable the user device 110 to capture, store, and/or manage various aspects of images, such as digital images and associated digital image files. In one aspect, the instructions and/or programs stored in the image module 134 may configure the processors 120 to receive signals from the image scanner 116 and construct an image file therefrom. The user device 110, by executing instructions stored in the image module 134, may be configured to store image data files in the memory 130. The processors 120 may further be configured to provide and/or transmit one or more images or associated image files and/or image related data to the eWallet system 170 or other entities via the networks 146 or other suitable communicative connections. The processors 120, by executing instructions stored in the image module 134, may further be configured to receive images from the one or more entities, such as the vendor/biller computers 160 and/or the financial institution computers 150 or other suitable entities, via the networks 146 or other suitable communicative connections. The processors 120 may yet further be configured to manage images that are stored in one or more databases, such as in the memory 130 or a suitable database external to the user device 110. In one aspect, the processors 120, by running instructions and/or programs stored on the image module 134, may be configured to render one or more images on the display 112 in cooperation with processes enabled by the user interface module 140. In another aspect, the processors 120, by running instructions and/or programs stored on the image module 134, may be able to manipulate images and associated files and/or data, such as concatenating two or more images.

The parameters module 136 may have stored thereon instruction and/or programs that when executed by the processors 120, may enable the user device 110 to perform various functions associated with payment instrument data elements. In one aspect, the processors 120, by executing instruction stored on the parameters module 136 may be able to display data elements associated with one or more images. These data elements may include data elements associated with one or more payment instruments associated with a financial institution and/or associated with a financial account. In certain embodiments, the processors 120 may be configured to receive these payment instrument data elements from the eWallet system 170 or other entities via the networks 146 or other suitable communicative connections. The processors 120, by executing instructions stored in the parameters module 136, may further be configured to render the received data elements, such as payment instrument data elements, on the display 112 of the user device 110 in cooperation with processes enabled by the user interface module 140. Further still, the processors 120, by executing instructions stored in the parameters module 136, may be configured to receive user 102 input in approving and/or modifying the payment instrument data elements that are displayed on the display 112 of the user device 110. In one aspect, the processors 120 may receive an input from the user 102 via the keyboard 114 or other suitable I/O component of the user device 110.

The parameters module 136 may further have stored thereon instruction and/or programs that when executed by the processors 120, may enable a user 102 using the user device 110 to receive an approval for the use of a payment instrument from an individual that is at least partially fiducially responsible for that payment instrument. For example, a child may want to create an eWallet account with his/her parent's payment instrument linked to a financial account for which the parent is fiducially responsible. In this case, the instructions stored in the parameters module may enable receiving authorization from the parent for the use of the payment instrument. Such a transaction may entail, receiving authorization for the use of a payment instrument via one or more I/O components 112, 114, 116, of the user device 110 associated with the payment instrument. In certain embodiments, a message (e.g., email, text message, or push notification) may be sent to the owner of the payment instrument, such as to a contact identifier (e.g., email address or phone number) of the owner to solicit authorization for another person to use the payment instrument. In other embodiments, the owner of the payment instrument may provide the payment instrument data elements and/or payment instrument images for incorporation in another individual's eWallet account. The communication sent by the user to the owner of the payment instrument may include a secure link, that when selected, renders to the owner of the payment instrument a secure website where he/she may authorize the use of the payment instrument by the user. In this case, the user may initiate this process by providing an email address and/or phone number of the owner of the payment instrument.

In certain embodiments, the owner of the payment instrument and/or user may be able to further specify parameters for the use of the payment instruments, such as spending limits or venders where money may be spent. Therefore, these parameters may be directed to terms and/or limitations of use of the authorized payment instrument that is imposed by the owner of the payment instrument or the user. The instructions stored in the payment module 136, when executed by the processors 120 may enable the establishment of these parameters via interaction with at least one of the owner of the payment instrument or the user. For example, such parameters may be specified during the authorization process when the owner of the payment instrument interacts with the eWallet system 170 to authorize the use of the payment instrument. Additionally, the eWallet system 170 may be configured to receive input from the owner of the payment instrument to initiate and or modify parameters associated with terms and/or limitations of use of the payment instruments subsequent to authorization of the use of the payment instrument.

The eWallet module 138 may have stored thereon instruction and/or programs that when executed by the processors 120, may enable the user device 110 to perform various functions associated with viewing, managing, editing, and/or using an eWallet account. Authentication credentials, such as login and password may be utilized to control access to a user's 120 eWallet account. Therefore, the processors 120 may receive authentication credentials from a user 102 and transmit the authentication credentials to the eWallet system 170 for enabling access to the eWallet account. Upon, access to the eWallet account, a user 102 may be able to perform various actions associated with his/her eWallet account. In certain embodiments, user device 110 and the processors 120 thereon may be configured to interact with the eWallet system 170, based at least in part on user interaction with the user device, to view payment instruments associated with the eWallet account of the user 102. In this case, the user device 110 may be configured to receive information associated with payment instruments in the user's eWallet account and display the information on the user interface 112 of the user device 110. In the same or further embodiments, user device 110 and the processors 120 thereon may be configured to interact with the eWallet system 170, based at least in part on user interaction with the user device, to edit payment instruments associated with the eWallet account of the user 102. In this case, the user device 110 may be configured to receive information associated with payment instruments that the user 102 would like to delete, edit, and/or add to his/her eWallet account.

Further still, the instructions stored in the eWallet module 138 may enable the user 102, via his/her user device 110, to use his/her eWallet account to make purchases and/or payments, such as by using one or more payment instruments associated with his/her eWallet account. To make payments, the eWallet account may interact with a vendor website, or may be a captive eWallet account associated with a particular vender or financial service provider website. Therefore, the user device 110 and the processors 120 thereon may be configured to interact with a vendor website, such as a vendor website served by biller/vendor computers 160, and the eWallet website, such as an eWallet account served by the eWallet system 170, at the same time. In some cases, the user device 110 may facilitate, broker, authorize, authenticate, and/or host the interaction between biller/vendor computers 150 and the eWallet system 170. The directing of the financial transaction may entail generation and transmittal of a payment request to the eWallet system 170 or other suitable entity via the networks 146 or other suitable communicative connection. The payment request may indicate a user instruction to execute a financial transaction and may be acted on by the eWallet system 170 and/or other payment system, when received, to effect the financial transaction. The user interaction for soliciting approval and/or modification of the proposed payment may be conducted via one or more of suitable I/O components 112, 114, 116 of the user device 110.

The user interface module 140 may further have stored thereon instruction and/or programs that when executed by the processors 120, may enable a user 102 using the user device 110 to interact with one or more user interfaces. The processors 120 may be configured to display one or more instructions to capture payment instrument images, one or more payment instrument images, one or more extracted data elements associated with a payment instrument, and/or solicit instructions to verify one or more displayed payment instrument data elements. The aforementioned elements may be displayed on the one or more displays 112 of the user device 110.

It should be noted that the instructions, applications, and/or software, as stored in the various modules 132, 134, 136, 138, 140 may be download from a server by the user device 110 via the networks 146 or other suitable communicative connections. In certain embodiments, the user device 110 may be configured to download an eWallet application installer via the Internet and then the processors 120 may be configured to execute the installation program to store appropriate instructions in the operating system (O/S) and/or applications 132, the image module 134, the parameters module 136, the eWallet module 138 and/or the user interface module 140. In other non-limiting examples, a thin client user interface may be received by the user device 110 and rendered to the user 102 utilizing software, such as a web page viewer, to interact with the user 102 for providing eWallet functionality.

It will be appreciated that there may be overlap in the functionality of the instructions stored in the operating system (O/S) and/or applications 132, the image module 134, the parameters module 136, the eWallet module 138 and/or the user interface module 140. In fact, the functions of the five aforementioned modules 132, 134, 136, 138, and 140 may interact and cooperate seamlessly under the framework of the user device 110. Indeed, each of the functions described for any of the modules 132, 134, 136, 138, 140 may be stored in any other module 132, 134, 136, 138, 140 in accordance with certain embodiments of the disclosure. Further, in certain embodiments, there may be one single module that includes the instructions, programs, and/or applications described within the operating system (O/S) and/or applications 132, the image module 134, the parameters module 136, the eWallet module 138, and/or the user interface module 140.

The financial institution computers 150 may be affiliated with a variety of financial institutions or payment networks. Each of these financial institutions or payment networks may be affiliated with any one or more of the user 102, the vendor and/or biller, or the eWallet system 170. In one aspect the financial institution computers 150 associated with a particular financial account of the user 102 may be configured to receive a debit instruction to debit a specified amount of money from the account of the user 102. In another aspect the financial institution computers 150 associated with a particular financial account of the biller may be configured to receive a credit instruction to credit a specified amount of money to an account of the biller. In certain embodiments, the financial institution computers 150 may be configured to receive credit and/or debit instructions from the eWallet system 170 and/or other entities of the architecture 100 via the networks 146 and/or other suitable communicative links. The financial institutions affiliated with the financial institution computers 150 may issue the payment instruments that may be associated with the eWallet account of the user 102. In certain embodiments, authorization and/or certification of a particular payment instrument and/or the incorporation of that payment instrument in a particular eWallet account may be obtained from a relevant financial institution or payment network via associated financial institution computers 150. The vendor/biller computers 160 may be affiliated with one or more vendors or billers and may be configured to communicate with the user device 110 to provide a bill to or support a payment request from a user 102 associated with the user device 110. Therefore, in certain embodiments, the vendor/biller computers 160, or a service provider thereof, may be configured to provide the user 102 with a paper or digital image of a bill for products or services that may have been provided or will be provided by the biller. In certain other embodiments, the vendor/biller computers 160, or a service provider thereof, may be configured to receive a payment request from the user 102, possibly in association with a purchase order or in association with a bill. In certain embodiments, the service provider associated with the biller may be the service provider associated with the eWallet system 170. In other embodiments, the biller and/or the vendor/biller computers 160 may generate a bill printed on paper and may provide the paper bill to the user via any suitable mechanism including postal and/or currier services. For the purposes of this disclosure, the vendor or biller may be any entity that provides a bill, either electronically or in physical form, to the user 102, or receives payment from the user for goods or services, whether previously billed or just purchased. The vendor or biller may provide the bill for a purchase or services rendered that include utilities, telecommunications, media content delivery, transportation services, retail services, lawn services, repair services, financial services, or the like. The vendor or biller may provide the bill for a purchase or products that include manufactured goods, imported goods, consumer goods, industrial goods, capital goods, or the like. The systems and methods, as disclosed herein, may enable a payment to be made on behalf of a user 102 with one or more payment instruments in the user's eWallet account, as hosted by the eWallet system and accessed by the user device 110. It will further be appreciated that in certain embodiments, the eWallet system 170 and the vendor/biller computers 160 may be the same entity. This may particularly be the case in embodiments where the eWallet account is a captive eWallet account that is associated with a particular vendor/biller. Therefore, a single entity, in these embodiments, may control both the repository of payment instruments, such as the eWallet, for making a purchase and/or payment, as well as, the vendor computers 160 for executing product or service sales.

The eWallet systems 170 may include one or more processors 172, one or more input/output (I/O) interfaces 174, one or more communications interfaces 174, one or more external storage controllers 178, and/or one or more memories 180, all residing on the same server platform or distributed across multiple server platforms It will be appreciated that the payment systems 170 may include other components or elements that enable the payment systems 170 to perform the methods and processes described herein in accordance with embodiments of the disclosure. In some cases, the eWallet systems 170 may be capable of instantiating payments and may accordingly be referred to as payment systems. Furthermore, in the same or other embodiments, the eWallet systems 170 may be integrated with the biller/vendor computers 160 as vendor computers with payment instrument repository functionality. In these embodiments, the eWallet functionality may be a captive eWallet where the eWallet may be used by the user 102 with one or otherwise a limited number of vendors.

The I/O interfaces(s) 174, may include any suitable interface configured to interface between the processors 172 and one or more I/O components (not shown) of the eWallet system 170. The I/O interface(s) may enable users to interact with the eWallet system 170 locally. The communications interfaces(s) 124 may allow the eWallet system 170 to communicate with stored databases, other computing devices or servers, user terminals, and/or other devices via the networks 146 or other suitable communicative channels. The external storage controllers 178 may enable communications with one or more external storage devices and/or databases, such as a transaction database 190 as illustrated.

The memory 180 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 130 may store program instructions that are loadable and executable on the processor(s) 172, as well as data generated or received during the execution of these programs. Turning to the contents of the memory 180 in more detail, the memory 180 may include an operating system (O/S) and/or applications 182, an image processing module 184, a parameter module 186, and/or an eWallet module 188. Each of the modules and/or software may provide functionality for the eWallet system 170, when executed by the processors 172. The modules and/or the software may or may not correspond to physical locations and/or addresses in memory 180. In other words, the contents of each of the modules may not be segregated from each other and may, in fact be stored in at least partially interleaved positions on the memory 180. The O/S and/or applications 182 may be the same or similar to the O/S and/or applications 132 of the user device and, therefore, in the interest of brevity, the description of the O/S and/or applications 182 will not be repeated here.

The image processing module 184 may have instructions and/or applications stored thereon that may be accessed and/or executed by the processors 172, thereby enabling the processors 172 to perform a variety of image processing tasks. These image processing tasks may entail receiving images, storing and/or retrieving stored images, performing image processing on received and/or stored images, extracting information and/or data elements from images, or the like.

Receiving images may entail receiving an image from another entity of the architecture 100. In other cases, the processors 172 may retrieve or receive images, such as payment instrument images, from the memory 180, payment instrument database 190, or other storage locations accessible by the eWallet system 170. For example, the eWallet system 170 and the processors 172 thereon, may receive a payment instrument image of a payment instrument or a portion thereof, from the user device 110. In certain embodiments, the payment instrument may be one or more of a check, a credit card, a debit card, a prepaid card, or the like. In these cases, the payment instrument image may include an image of a front of a check, an image of a back of a check, an image of a front of a credit card, an image of a back of a credit card, an image of a front of a debit card, an image of a back of a debit card, an image of a front of a prepaid card, an image of a back of a prepaid card, or combinations thereof.

Performing image processing and/or extracting data elements form images may be performed by at least a subset of the processors 172 by performing a variety of algorithms. Therefore, at least a subset of the processors 172 may be configured to perform image filtering, image sharpening, modifying an image orientation, modifying the dithering of one or more pixels of the image, modifying the contrast of the image, modifying the brightness of the image, processing metadata associated with the image, image field recognition, text sequence recognition, optical character recognition, intelligent character recognition, or the like. It will be appreciated that the aforementioned algorithms are not, in any way, an exhaustive list of image processing and/or manipulation algorithms and embodiments of the disclosure may utilize algorithms that are not listed in the preceding list. It will further be appreciated that some or all of the aforementioned algorithms may be performed by the user device 110 and the processors 120 thereon.

In one aspect, at least a subset of the processors 172, by executing instructions stored in the image processing module, may be configured to extract particular data elements from particular image types. For example, the eWallet system 170 may be configured to receive a payment instrument image of a payment instrument or a portion thereof and from the payment instrument image, the eWallet system 170 may be configured to extract payment instrument data elements, such as an identification of a payment instrument type, an identification of the user's address, an identification of the user's payment address, an identification of the user's telephone number, an identification of the financial account, an identification of a financial account number, an identification of a routing number, an identification of a check number, an expiration date, a card verification string, a card verification value (CVV), or combinations thereof.

The parameters module 186 may have instructions and/or applications stored thereon that may be accessed and/or executed by at least a subset of the processors 172, thereby enabling at least a subset of the processors 172 to perform a variety of data processing and payment instrument data element verification tasks. These data processing tasks may entail communicating data elements and/or approved data elements, analyzing data elements, storing and/or managing payment instruments, and receiving and/or analyzing financial account information. The payment instrument data element verification tasks may include verifying if a particular user is authorized to use payment instruments that he/she may attempt to add to his/her eWallet account. In certain embodiments, the payment instruments that are to be added to a particular eWallet account may not be owned by the user 102 with whom the eWallet account is associated. In other words, the user 102 of the eWallet account may choose to have payment instruments in his/her eWallet account that are owned by another person or for which another person is fiducially responsible. In these cases, the instructions stored in the parameters module 186 may enable the user 102 to establish payment instruments in his/her eWallet account that may be controlled by another individual.

In one aspect, at least a subset of the processors 172 may be configured to transmit a variety of image related data elements, as determined by processes enabled by the instructions in the image processing module 184, to the user device 110 of a particular user 102 via the networks 146 or other suitable communicative connections. For example, the eWallet system 170 may be configured to transmit payment instrument data elements that may be determined by the eWallet system 170 from payment instrument images received by the eWallet system 170. As another example, the eWallet system 170 may be configured to receive one or more approved payment instrument data elements from the user device 110.

In the cases where the user 102 attempts to add a payment instrument for which he/she is not the owner or otherwise fiducially responsible, at least a subset of the processors 172, by executing instructions stored in the parameters module 186 may receive and/or solicit authorization from the owner and/or the fiducially responsible individual of the payment instrument. Furthermore, the eWallet system 170 and at least a subset of the processors 172 thereon may be configured to receive and or solicit parameters related to restrictions that may be placed on the usage of the payment instruments for which the user 102 and/or the owner of the eWallet is not fiducially responsible. For example, the owner of the payment instrument or the user may set spending limits, vendor restrictions, single use limits, and/or vendor type restrictions on the use of the payment instrument. For example, a child may have her mother's credit card as a payment instrument on his eWallet account. The mother, when authorizing the use of the credit card, may provide a spending limit, such as $250 per month, types of restricted vendors, such as liquor stores, and a single use limit of $25 per use. In this example, the mother may interact with the eWallet system 170 to authorize the use of the credit card by her son with the example restrictions thereon. In certain embodiments, the eWallet system 170 and/or the user 102 may provide an email and or text message to the authorizer of the payment instrument to follow a link, such as a secure socket hypertext mark-up language (https) link to provide authorization for the use of the payment instrument. This link may enable communications and authorization between the owner of the payment instrument and the eWallet system 170.

The eWallet module 188 may have instructions and/or applications stored thereon that may be accessed and/or executed by the processors 172, thereby enabling the processors 172 to support a variety of payment and/or bill payment tasks. Such support may entail retrieving information associated with a payment instrument (potentially validating its use relative to any stored parameters), transmitting payment instrument information to another Website or application; instantiating one or more debit transactions, instantiating one or more credit transactions, and/or providing confirmation of a payment initiated by a user 102. At least a subset of the processors 172 may receive an eWallet request from the user device 110 or other entities. In certain embodiments, the payment instrument information transmitted by the eWallet may be used by the vendor/biller computers 160 to receive payment from a financial account associated with the payment instrument from one or more financial institution computers 150. In other embodiments, at least a subset of the processors 172 may be configured to generate and/or transmit one or more credit and/or debit instructions to one or more financial institution computers 150 based at least in part on the received eWallet request. At least a subset of the processors 172 may, yet further, be configured to receive a confirmation of the execution of individual credit and/or debit instructions from the financial institution computers 150. At least a subset of the processors 172, upon receiving confirmation of the execution of one or more credit and/or debit transactions associated with an eWallet request, may be configured to provide a confirmation of payment. This confirmation of payment may be transmitted by the eWallet system 170 to the user device 110 via the networks 146 or other suitable communicative connections. In some cases, the confirmation may be transmitted upon the payment system successfully completing its processing and initiating transactions, without having received confirmation itself (some payment mechanisms, like the ACH network, may not provide positive confirmation).

It will be appreciated that there may be overlap in the functionality of the instructions stored in the O/S and/or applications module 182, image processing module 184, parameters module 186, and the eWallet module 188. In fact, the functions of the four aforementioned modules 182, 184, 186, 190 may interact and cooperate seamlessly under the framework of the eWallet system 170. Indeed, each of the functions described for any of the modules 182, 184, 186, 188 may be stored in any other module 182, 184, 186, 188 in accordance with certain embodiments of the disclosure. Further, in certain embodiments, there may be one single module that includes the instructions, programs, and/or applications described within the O/S and applications module 182, image processing module 184, parameters module 186, and the eWallet module 188.

The networks 146 may include any one or a combination of different types of suitable communications networks, such as cable networks, the Internet, wireless networks, cellular networks, and other private and/or public networks. Furthermore the networks 146 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

Figure 2:
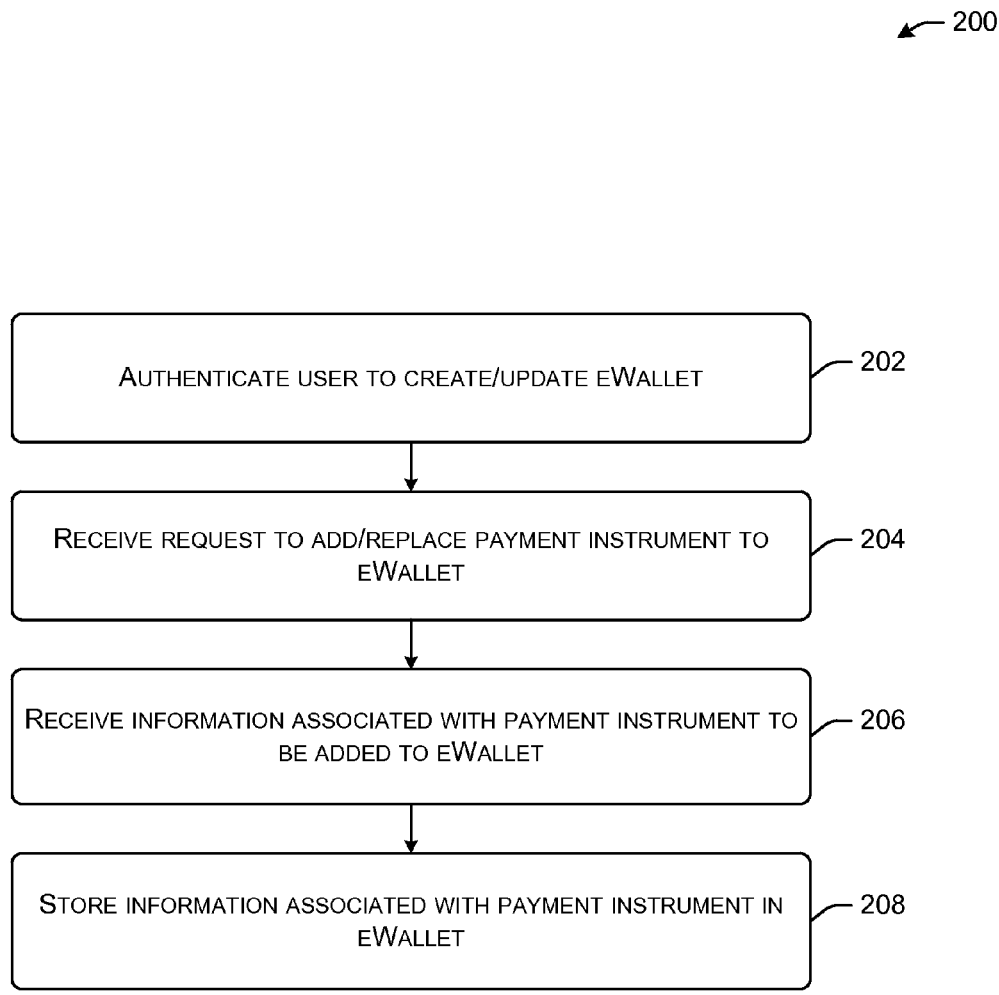
FIG. 2 is a flow diagram illustrating an example method performed by an eWallet system in accordance with illustrative embodiments of the disclosure.

Referring now to FIG. 2, a simplified flow diagram illustrating an example method 200 to add and/or modify payment instrument information in an eWallet account. The method 200 may be executed by the eWallet system 170 and/or the user device 110 potentially in cooperation with one or more other entities of the architecture 100. For simplicity's sake, the method 200 is described as being performed in a primarily server-based implementation by eWallet system 170. However, it will be appreciated that one or more functions, as described herein, may be performed by other entities of architecture 100, such as the user device 110. At block 202, a user may be authenticated to create or update an eWallet account associated with the user. The authentication process may entail receiving authentication credentials, such as from a user device 110 from which a particular eWallet account access is attempted.

At block 204, a request to add a payment instrument to the eWallet, or modify a payment instrument already in the eWallet, may be received. This request may be generated by an application running on the user device 110, such as the eWallet application, that is configured to generate a message indicative of a user's desire to modify his/her eWallet account or modify information associated with a particular payment instrument in his/her eWallet account. The request may be in the form of one or more data packets and may be received via the networks 146.

At block 206, information associated with the payment instrument to be added or modified may be received. The information may be in the form of one or more images of the payment instrument. The information may further be provided through iterative interaction between the eWallet system 170 and the user device 110 with user 102 input. For example, the user device 110 may provide confirmation of payment instrument data elements and/or changes thereto. The eWallet system 170 may further receive any parameters and/or limitations to the use of a particular payment instrument. The parameters and/or limitations to use of the payment instrument may be received from either the user or a party other than the owner of the eWallet account, such as an individual that is fiducially responsible for the payment instrument.

Next, at block 208, the information associated with the payment instrument may be stored in the eWallet account. The payment instrument information may include the payment instrument data elements authorized by the user 102 for the payment instrument. The storage may be in the memory 130 of the user device, memory 180 of the eWallet system 170, and/or the payment instrument database 190. The payment instrument information may be associated with the eWallet account of the user 102 in a manner such that the payment instrument is displayed and/or accessed when the user 102 accesses his/her eWallet account, such as via his/her user device 110. The parameters and/or limitations associated with the payment instrument, such as limitations set on spending by a party other than the eWallet account owner, may also be stored with the payment instrument data elements.

It should be noted, that the method 200 may be modified in various ways in accordance with certain embodiments of the disclosure. For example, one or more operations of the method 200 may be eliminated or executed out of order in other embodiments of the disclosure. Additionally, other operations may be added to the method 200 in accordance with other embodiments of the disclosure.

Figure 3:
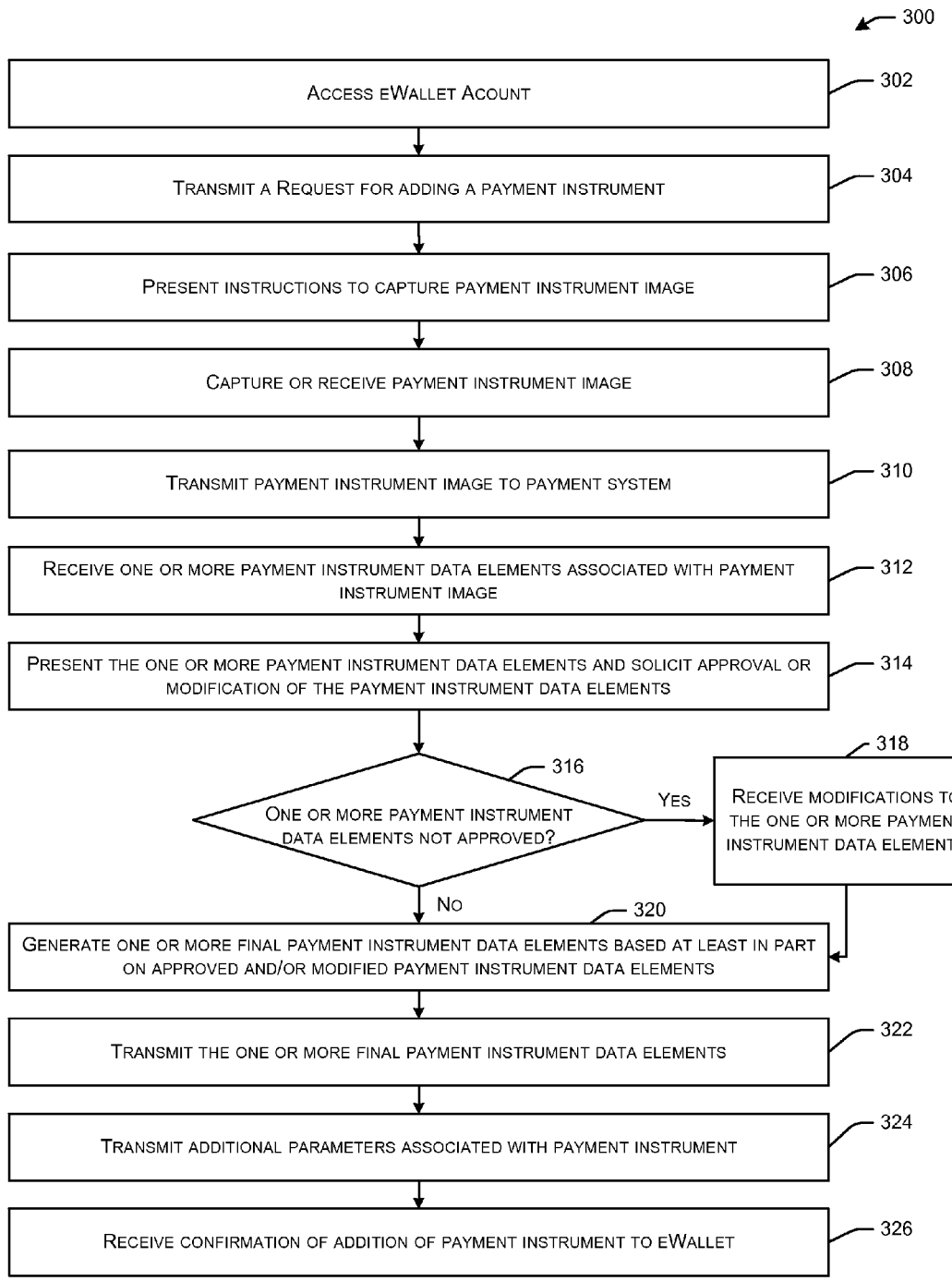
FIG. 3 is a flow diagram illustrating an example method performed by a user device for providing payment instrument information in accordance with illustrative embodiments of the disclosure.

Referring now to FIG. 3, an example method 300 performed by the user device 110 in accordance with embodiments of the disclosure to effect a bill payment is described. Method 300, in certain embodiments, may be performed by the user device 110 interacting with one or more other entities of the architecture 100 such as a corresponding respective user 102 and a eWallet system 170.

At block 302, an eWallet account may be accessed. This may be performed by the user device 110 by interacting with the user 102 associated with the accessed eWallet account. In certain embodiments, this process 302 may involve soliciting and/or receiving authentication credentials from the user 102. The authentication credentials may include a variety of elements, including, but not limited to, text, such as a login and password, images, sounds, and/or biometric data, such as retinal scan, voice recognition, and/or fingerprint scan. This process may further involve transmitting the received authentication credentials to the eWallet system 170 to gain access to the eWallet account of the user. This process may further involve receiving confirmation of authentication success or failure from the eWallet system 170.

At block 304, a request for adding a payment instrument may be transmitted. In certain embodiments (e.g., a mobile app or other "fat client" scenarios), this step may be optional. This request may be transmitted by the user device 110 on behalf of the user 102 to the eWallet system 170. The request for adding a payment instrument may be indicative of the user's intent to add a payment instrument to his/her eWallet account. The request for adding a payment instrument may further be generated by the user device 110 and the processors 120 thereon. The generation of the request may be performed by the processors 120 by executing instructions, such as code of an application, for interacting with the eWallet system 170.

At block 306, instructions to capture a payment instrument image may be presented. The instruction may be received and/or retrieved by the user device 110 and the processors 120 thereon. The received instructions may be rendered to the user 102 associated with the user device 110 such as via the display 112 or a speaker of the user device or any other suitable I/O component. The instructions may, in certain embodiments, be received from the eWallet system 170 and may instruct the user 102 of which parts of a payment instrument may be included in the payment instrument image. Alternatively, the instructions associated with capturing the payment instrument image may be stored locally on the user device 110, such as on the memory 130. As an example, the payment instrument instructions may provide instructions to capture an image of front side of a check. As another example, the payment instructions may provide instructions to capture an image of both the front side and the back side of a credit card in cases where the card verification string and/or CVV may be on the backside of the credit card. The singular "payment instrument image" continues to be used in this description even though it should be understood that this may encompass more than one related images; e.g., an image of the front side of a card and an image of the back side of the card.

In certain embodiments, the payment instrument image may have previously been captured and processed, and either the payment instrument image or extracted element may have been stored on the user device or at a remote location, such as in memory 130 or at the eWallet system 170. In these embodiments, the process of block 306 may be optional and instead, the payment instrument image or associated data elements may be received by the user device 110 directly from where the payment instrument image may be stored.

At block 308, the payment instrument image may be captured or received. The receiving may be from wherever the payment instrument image was stored. For example, an electronic payment instrument image may be retrieved by the processors 120 from the memory 130. In capturing the payment instrument image, an image scanner 116 may be used by the user device 110, the processors 120 thereon, and/or the user 102 to capture the payment instrument image. In certain embodiments, the captured or received payment instrument image may be electronically stored, such as on the memory 130 of the user device 110.

At block 310, the payment instrument image may be transmitted to the payment system. The transmission may be via the networks 146 or any suitable communicative connection between the user device 110 and the eWallet system 170. In certain embodiments, the transmitted payment instrument image may be encrypted or otherwise transmitted over a secure communicative link between the user device 110 and the eWallet system 170. In certain further embodiments, the payment instrument image may be uploaded to a website that is either served by the eWallet system 170 or accessible by the eWallet system 170 to retrieve the payment instrument image. In some cases, if a mechanism of uploading to a website is used for the transmission of the payment instrument image to the eWallet system 170, the connection to the website may be encrypted or otherwise secured by any variety of mechanisms, such as by using secure socket layer (SSL).

At block 312, one or more payment instrument data elements, or indications thereof, associated with the payment instrument image may be received. The payment instrument data elements may be received from the eWallet system 170 via the networks 146 or other suitable communicative connections. The payment instrument data elements may be ascertained by the eWallet system 170 based at least in part on the payment instrument image. Alternatively, the payment instrument data elements may be extracted or otherwise ascertained by the user device 110 and the processors 120 thereon by applying any variety of image processing and/or character recognition algorithms to the payment instrument image. In certain embodiments, a text string or logo associated with the financial institution corresponding to the account number (or portion thereof, like the RTN) may be received and displayed. This may enhance the user experience and user 102 confidence in the system.

At block 314, the one or more payment instrument data elements may be presented to the user and an approval or modification of the payment instrument data elements may be solicited. In one aspect, the one or more payment instrument data elements may be presented via one or more I/O components such as on the display 112. The approval solicitation may entail directing the user to review the one or more payment instrument data elements and click on an approval and/or confirmation button rendered on the display 112 to effectuate approval. The user device 110 may further solicit any changes to the one or more payment instrument data elements by allowing the user 102 to enter new values for one or more of the one or more payment instrument data elements.

At block 316, it may be determined if one or more payment instrument data elements, as received, are not approved. If the received data elements were not approved, then modifications to at least one of the one or more payment instrument data elements may be received at block 318, such as by user input 102 via one or more I/O components such as keyboard 114, a pointing device, or the like. Upon receiving either the approval or new values for at least one of the one or more payment instrument data elements from the user 102, the user device 110 may generate one or more final payment instrument data elements at block 320. In the case of the received one or more payment instrument data elements being approved at block 316, the one or more final payment instrument data elements may be the same as the one or more received payment instrument data elements received at block 312. Otherwise, at least one element of the one or more final payment instrument data elements may be different from the one or more payment instrument data elements received at block 312. At block 322, the one or more final payment instrument data elements, or indications thereof, may be transmitted to the eWallet system via the networks 146 or other suitable communicative connections.

At block 324, additional parameters associated with the payment instrument may be transmitted. This step may be optional and may only be performed if additional parameters associated with the payment instrument are to be transmitted from the user device 110. In this case, the additional parameters may be related to limitations on the use of the payment instrument. For example, the limitations may pertain to allowed financial transactions, such as spending limits, vendor and/or vendor type restrictions, transaction volume limits, time of use restrictions, transaction geography/location restrictions, or the like. The limitations may further pertain to financial flow and/or mechanism, such as stipulations on allowed direction of financial flow (debit only, credit only, both), allowed financial application context(s) (transaction parties, websites, types of transactions, financial applications, such as CheckFree RXP, PoPMoney, and/or TransferNow, etc.). In this case, the additional parameters may be provided by the user 102 or another person using the user device 110. In other embodiments, the additional parameters may be provided to the eWallet system 170 from another user device 110, such as a user device 110 associated with an individual other than the user 102 and owner of the eWallet account that provides At block 326, confirmation may be received of the addition of the payment instrument to the eWallet account. The confirmation may be in the form of a message comprising one or more data packets received via the networks 146 or other suitable communicative links. Upon receipt of the confirmation, an indication of the same may be rendered on a user interface 112 of the user device 110 to the user 102.

It should be noted, that the method 300 may be modified in various ways in accordance with certain embodiments of the disclosure. For example, one or more operations of the method 300 may be eliminated or executed out of order in other embodiments of the disclosure. Additionally, other operations may be added to the method 300 in accordance with other embodiments of the disclosure.

Figure 4:
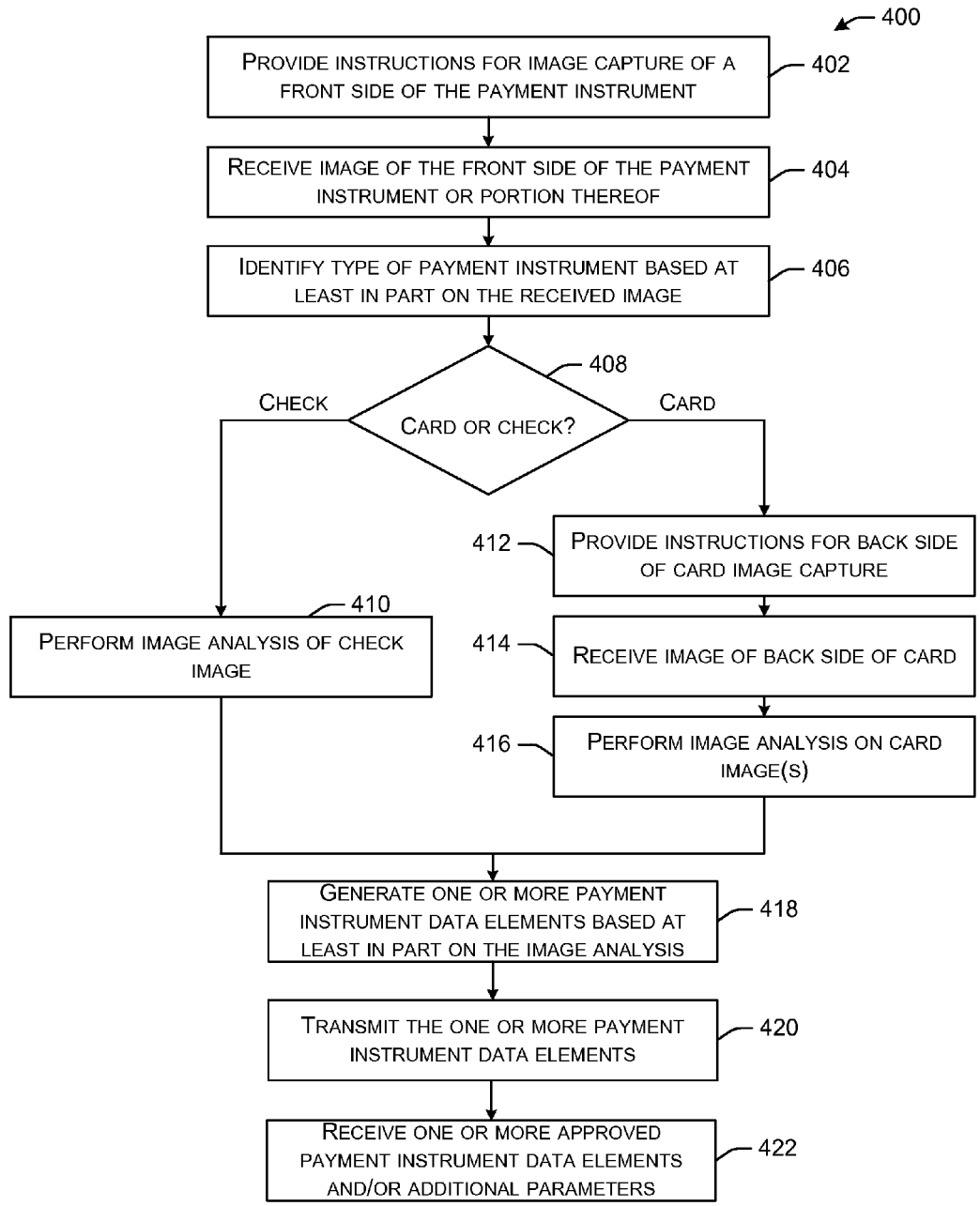
FIG. 4 is a flow diagram illustrating an example method performed by the eWallet system for adding a payment instrument to an eWallet account in accordance with illustrative embodiments of the disclosure.

Referring now to FIG. 4 an example method 400 for receiving information associated with a payment instrument to be added to an eWallet in accordance with embodiments of the disclosure is discussed. In certain embodiments, the method 400 may be performed by the eWallet system 170 in cooperation with other entities of the architecture 100, such as user devices 110 and the financial system computers 150. Method 400 may be an example of process 206 of method 200 of FIG. 2. At block 402, instructions may be provided for capturing an image of a front side of the payment instrument. These instructions may be transmitted to the user device 110 via the networks 146 or other suitable communicative connections. The instruction may be rendered, such as displayed, on the user device 110 for the user 102.

At block 404, an image of the front side of the payment instrument may be received by the eWallet system. The image may, in certain cases, be an image of a portion of the payment instrument, such as the front of a credit card. The image may be received by the eWallet system 170 via the networks 146 or other suitable communicative links in the form of one or more data packets from the user device 110 or other suitable entity, such as a repository of payment instrument images. The image of the payment instrument may be in any suitable form and/or file format, such as Joint Photographic Experts Group (JPEG), graphics interchange format (GIF), portable network graphics (PNG), TIFF, BMP, or the like and/or in any suitable resolution, size, brightness, or aspect ratio. The image of the payment instrument may be acquired by the user device 110 in cooperation with the image scanner 116 and transmitted by the user device 110. The image of the payment instrument may be acquired by the user 102 in accordance with the instructions provided in block 402.

At block 406, the type of payment instrument may be identified based at least in part on the image of the front side of the payment instrument. It may be determined if the payment instrument is a card, such as a debit, credit, or prepaid card, or a check. The eWallet system 170 may analyze the image of the front of the payment instrument and identify one or more fields thereon to determine the type of payment instrument. In certain other embodiments, the eWallet system 170 may receive an indication of the type of payment from the user device 110. This indication may be determined by one or more applications running on the user device 110 or based on user 102 input to the user device 110. In certain further embodiments, the type of payment instrument may be ascertained by the eWallet system 170 transmitting a question asking the type of payment instrument to the user device 110 and receiving a response indicating the type of the payment instrument. This response may be based at least in part on a user input and/or interaction with the user device 110. In this case, the user device 110 may pose the question of the type of payment instrument to the user 102 via one or more I/O components 112, 114, 116 and receive a response indicative of the payment instrument from the user via the same or different I/O components 112, 114, 116.

If the payment instrument is a check, then at block 408, the method 400 may continue to block 410 image analysis may be performed on the check image. The image analysis may be performed, in certain aspects, to be able to extract information from the check image that can be used to effect a payment using a financial account associated with the check image. The image analysis, in certain embodiments, may be used to repair any defects in the received check image, if such processing has not already been performed by user device 110 or within another system, or is deemed still necessary. In fact, such processing could be split across more than one entity or system. Therefore, generic image improvement, as well as image analysis may be performed. For example, if the received check image has a lot of noise, or otherwise spots and/or streaks thereon, then filtering and/or dithering techniques may be used to reduce the level of noise in the image. As another example, if the image is skewed, or otherwise trapezoidal rather than rectangular, due to the angle of the image sensor relative to the check while the check image was captured, then various techniques may be used to reduce the trapezoidal effect. The image analysis may also be used to recognize text on the check image. Therefore, the image analysis techniques may include, but are not limited to, image filtering, image sharpening, modifying an image orientation, modifying the dithering of one or more pixels of the image, modifying the contrast of the image, modifying the brightness of the image, processing metadata associated with the image, image field recognition, text sequence recognition, optical character recognition, intelligent character recognition, or combinations thereof.

At block 408, if it was determined that the payment instrument is a card, then the method 400 may proceed to optional block 412, where instructions may be provided for capturing an image of the back side of the card. The back side may be needed in cases where there may be important transaction information on the back side of the card, such as the card verification string or the CVV. At block 414, optionally, an image of the backside of the card may be received. At block 416 image analysis may be performed on the card image(s) using techniques similar to those described in conjunction with the check image at block 410. Image improvement to enhance the image of the backside of the card may also be performed. As with the check image, image improvement may in a first alternative have already been performed entirely by another entity (e.g., user device 110)

or system, or in a second alternative may be split across more than one entity or system.

At block 418, one or more payment instrument data elements may be generated based at least in part on the image analysis. The payment instrument data elements may be associated with either the card or the check. For example, check related payment instrument data elements may include an identification of a payment instrument type, an identification of the user's address, an identification of the user's telephone number, an identification of a routing number, an identification of a financial institution, an identification of a financial account number, an identification of a check number, or combinations thereof. Card related payment instrument data elements may include an identification of a payment instrument type, an identification of a financial institution, an identification of a financial account number, an expiration date, a card verification string, a card verification value (CVV), or combinations thereof. At block 420, the one or more payment instrument data elements may be transmitted. In certain embodiments, the one or more payment instrument data elements may be transmitted by the eWallet system 170 to the user device 110 via the networks 146 or other suitable communicative connections.

At block 422, one or more payment instrument data elements and/or additional parameters may be received. The final payment instrument data elements may be received from the user device 110 via the networks 146 or other suitable communicative links. These final payment instrument data elements may be authorized by the user 102, as described in block 320 of method 300 of FIG. 3. The additional parameters associated with the payment instrument may be received from the same user device 110 as the one from which the approved payment data elements are received. This process is described from the perspective of the user device 110 at block 324 of method 300 of FIG. 3. In other cases, the additional parameters may be received from a different user device 110, such as a user device 110 associated with an individual that is fiducially responsible for the payment instrument to be added to the eWallet account. As discussed above, the additional parameters may set one or more restrictions and/or limitations on the usage of the payment instrument added to the eWallet account. These restrictions and/or limitations may, in certain embodiments, be more restrictive than limits on usage of the payment instrument that may be provided by the financial institution with which the payment instrument is affiliated.

Therefore, the eWallet system 170 may ascertain the payment instrument type based at least in part on the received payment instrument image. For example, the payment system may be able to distinguish between a check, a credit card, a debit card, or a prepaid card based at least in part on the received payment instrument image. In certain embodiments, the eWallet system 170 may be able to determine that the payment instrument is not a particular payment type, but may not be able to narrow down to a single payment type based on a first analysis of the payment instrument image. In these embodiments, the payment system may not ascertain which payment type is to be used prior to providing instructions for capturing the image of the payment instrument. Indeed, instructions may be provided for multiple payment type and upon receiving the payment instrument image from the user device 110, the payment system may ascertain the payment instrument type by analyzing the image and data fields and payment instrument data elements thereon. For example, if the eWallet system 170 detects a routing number, then eWallet system 170 may determine that the payment instrument image is associated with a check. On the other hand, if the payment system detects a particular credit card number, then the eWallet system 170 may determine that the payment instrument image is associated with a credit card.

It should be noted, that the method 400 may be modified in various ways in accordance with certain embodiments of the disclosure. For example, one or more operations of the method 400 may be eliminated or executed out of order in other embodiments of the disclosure. Additionally, other operations may be added to the method 400 in accordance with other embodiments of the disclosure.

Figure 5:
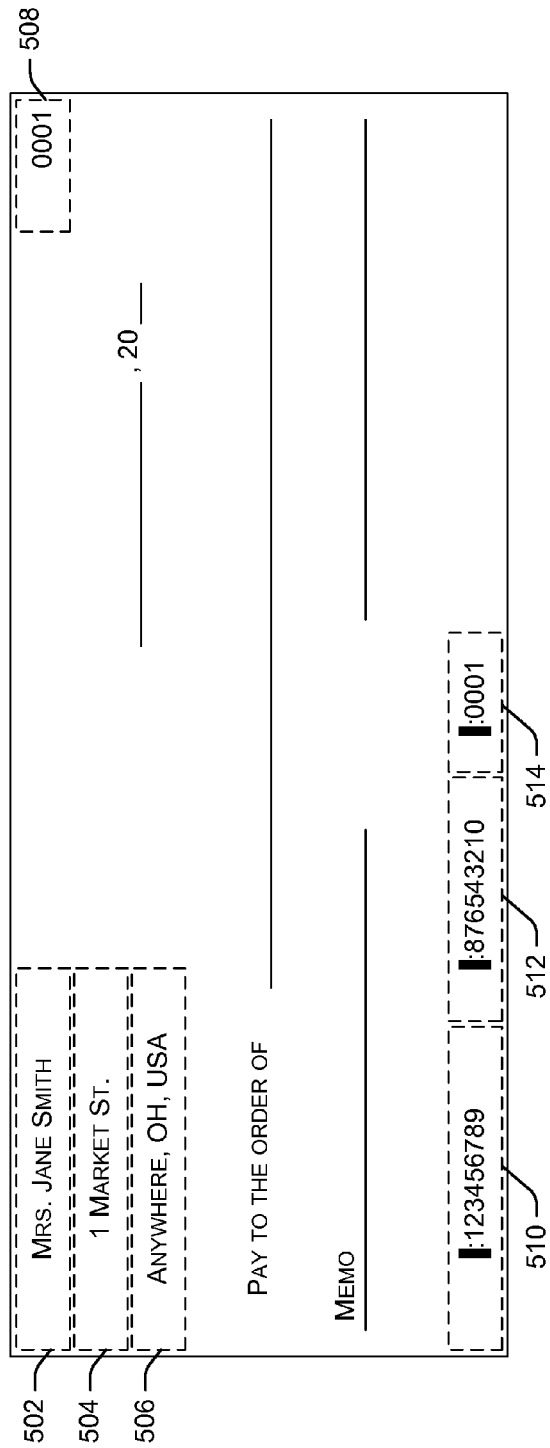
FIG. 5 is a schematic representation of an example image of a payment instrument with payment instrument data elements in accordance with illustrative embodiments of the disclosure.

Referring now to FIG. 5 an example image of a payment instrument 500 with payment instrument data elements identified in accordance with embodiments of the disclosure is described. The payment instrument associated with the payment instrument image 500 may be a check. Fields associated with magnetic ink character recognition (MICR), such as a routing number 510, an account number 512, and optionally the check number 514 may be identified. Fields corresponding to the user's identification 502, user's address 504, 506, and check number 508 may further be identified.

Referring now to FIG. 6 another example image of a payment instrument 600 with payment instrument data elements identified in accordance with embodiments of the disclosure is described. The payment instrument associated with the payment instrument image 600 may be a credit card. At a minimum, the account number 604 may be identified. Additional fields corresponding to a credit card association or issuer identification 602, an a member since date 606, the user's identification 608, a payment instrument expiration date 610, and a CVV 612, or other security code may be identified. It will be noted that in some cases the security code or CVV may be on the front side of the credit card. It will be appreciated that in this case, the payment instrument image(s) may include both the front side of the credit card 600 and the back side of the credit card 600. The back side may be needed in this case, since the CVV 612 is shown on the back side of the credit card 600. However, for certain credit cards, where the CVV may be shown on the front side, such as credit cards issued by American Express®, only an image of the front side of the credit card 600 may be needed to ascertain all the information for processing a bill payment in accordance with embodiments of the disclosure. Therefore, in certain embodiments, the eWallet system 170 may be configured to automatically identify the type of payment instrument 600, such as the type of debit and/or credit card, and identify if an image of the front of the payment instrument 600 or both the front and back of the payment instrument 600 may be needed.

Figure 7:
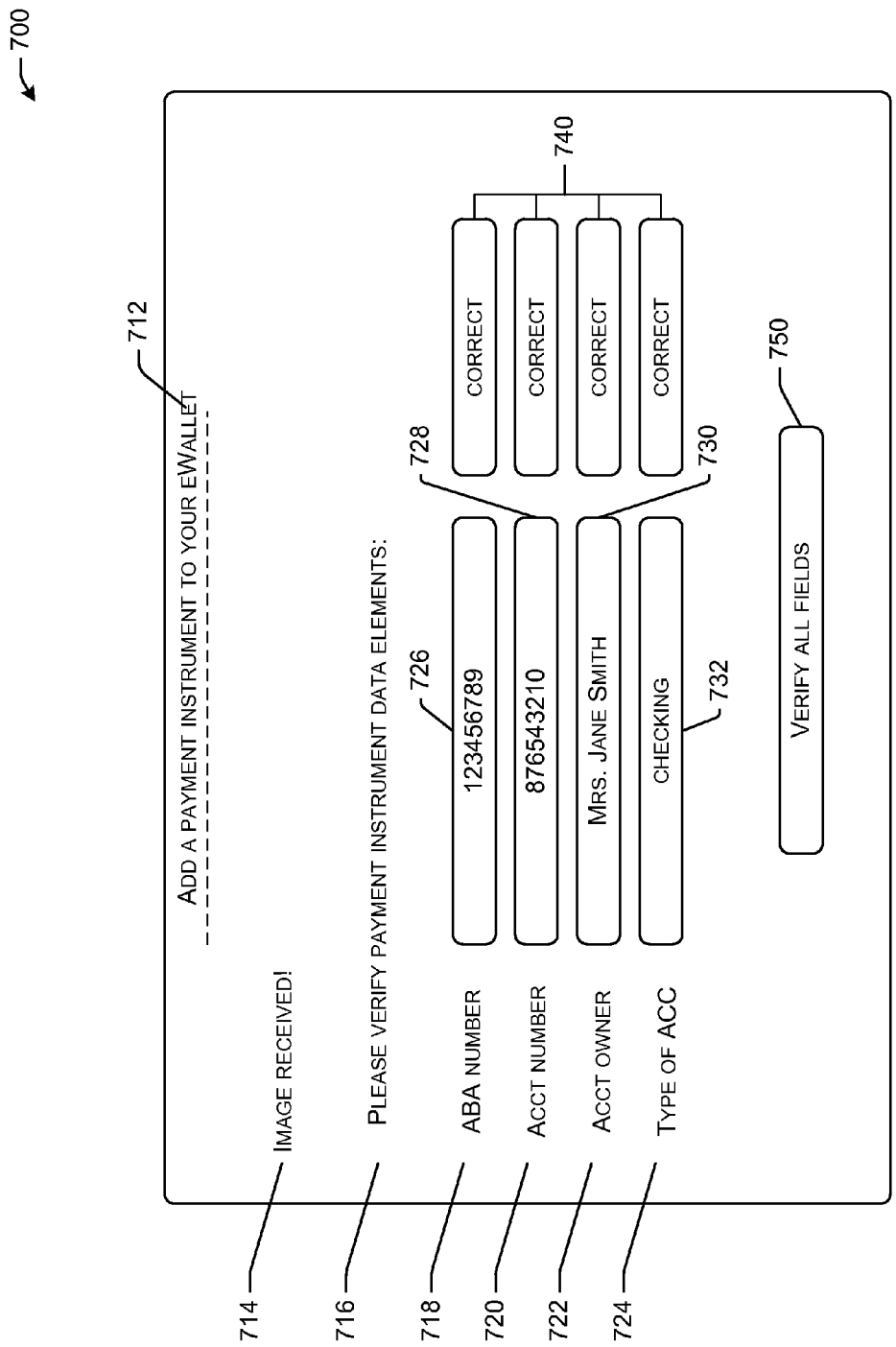
FIG. 7 is a schematic representation of an example user interface for adding a payment instrument to the eWallet account in accordance with illustrative embodiments of the disclosure.

Referring now to FIG. 7 a representation of an example user interface 700 within a series of user interface displays for adding a payment instrument to an eWallet account in accordance with illustrative embodiments of the disclosure. This user interface 700 may be displayed to the user 102 on his/her user device 110 during the process of adding a payment instrument to his/her eWallet account. The user interface 700 may be an example of the process of block 314 of method 300 of FIG. 3, where the user device 110 may receive data elements associated with the payment instrument to be added to the eWallet account of the user 102 from the eWallet system 170 to be approved by the user 102. This user interface 700 may enable the user to view the payment instrument data elements as ascertained by the eWallet system 170 and to approve and/or modify the presented payment instrument data element to generate a set of approved payment instrument data elements associated with the payment instrument.

The user interface 700 may include a title 712, such as a title 712 to indicate the functionality enabled by the user interface 700 and a status 714, such as an indication of the current processes performed to add the payment instrument to the user's eWallet account. The user interface 700 may further include instructions 716, such as instructions to verify payment instrument data elements. The user instrument may further list a variety of payment instrument data element identifiers 718, 720, 722, 724, and corresponding payment instrument data element values 726, 728, 730, 732, respectively. These payment instrument data elements may be extracted by the eWallet system 170 from an image of the payment instrument, or a portion thereof, such as payment instrument 500. The user interface 700 may still further include one or more user selection regions 740, 750. User selection regions 740 may enable the user 102 to modify one or more of the payment instrument data element values 726, 728, 730, 732, as presented. In some cases, by selecting one of the user selection regions 740, a corresponding payment instrument data element values 726, 728, 730, 732 may be modifiable by user 102 input to the user interface 700. In other cases, by selecting one of the user selection regions 740, another user interface may be displayed to the user 102 on the user device 110 to accept modification(s) to the displayed corresponding payment instrument data element. In yet other cases, fields that can be filled in by data entry or option selection may be presented adjacent to the display of the extracted values to accept modifications to the payment instrument data element values 726, 728, 730, 732. In still other cases, the extracted payment instrument data element values 726, 728, 730, 732 could themselves be overwritten. Once the user 10 is satisfied with the payment instrument data elements, as initially presented or after modification, he or she may select user interaction region 750 to approve the payment instrument data elements to generate the approved payment instrument data elements. These approved or verified payment instrument data elements may be transmitted by the user device 110 to the eWallet system 170 to be added to the user's eWallet account.

Referring now to FIG. 8, an example user interface 800 for providing parameters associated with a payment instrument to the eWallet account, in accordance with illustrative embodiments of the disclosure, is depicted. This user interface 800 may be accessed from the same user device 110 that was used to verify the approved payment instrument data elements or from another user device 110. The user interface 800 may include a title 802, an update and/or message 804, and further instructions 806. The user interface 800 may further include one or more parameter identifiers 808, 810, 812, 814 and corresponding entry fields 820, 824, 826, 828, respectively, where the user 102 may enter parameter values of the additional parameters, as depicted. The user interface may yet further include a statement that may indicate that one or more parameters may be verified by one or more other individuals that may be the owner of the payment instrument. A user interaction region 840 may be depicted on the user interface and when the user interaction region is selected by the user 102 using one or more I/O devices of the user device, may finalize and/or submit the entered parameters of the entry fields 820, 824, 826, 828.

Figure 9:
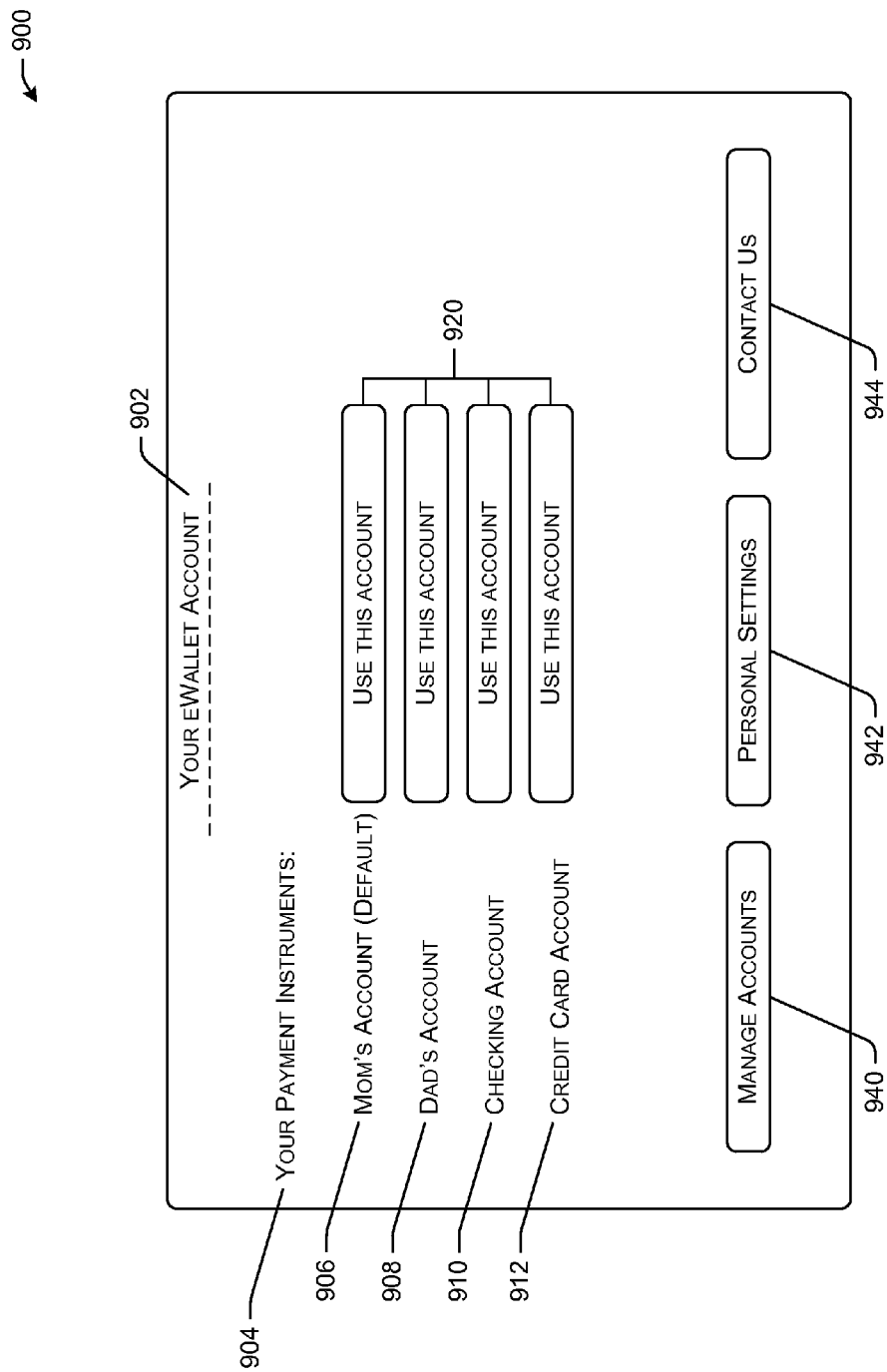
FIG. 9 is a schematic representation of an example user interface for the eWallet account with multiple payment instruments available for making a payment in accordance with illustrative embodiments of the disclosure.

Referring now to FIG. 9, an example user interface 900 for the eWallet account with multiple payment instruments available for making a payment, in accordance with illustrative embodiments of the disclosure, is discussed. The user interface 900 may include a title 902, a heading 904, identifiers of various payment instruments and/or associated accounts 906, 908, 910, 912 in the eWallet account, and user interaction regions 920 that when selected enables the use of a corresponding payment instrument and/or associated account 906, 908, 910, 912. Additional user interaction regions 940, 942, 944 may be provided to allow the user 102 to manage his or her accounts, view or edit his or her personal settings, and/or contact or access help associated with the eWallet system and service. In some cases, one or more of the payment instruments and/or associated accounts 906, 908, 910, 912 in the eWallet account may be a default account 906, as depicted.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device, or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A financial system, comprising:
one or more memories storing computer-executable instructions; and
one or more processors configured to access the one or more memories, wherein the one or more processors are further configured to execute the computer-executable instructions to:
receive, on behalf of a user, a front-side image that represents at least a portion of a payment instrument associated with a financial account associated with the user;
analyze the front-side image to determine one or more fields included in the front-side image;
determine a type of the payment instrument based at least in part on the one or fields, wherein the type of the payment instrument is one of a check or a payment card;
in response to determining that the type of the payment instrument is a payment card,
provide instructions for back-side image capture,
in response to providing the instructions for back-side image capture, receive a back-side image depicting a back side of the payment instrument, and
perform, using one or more image processing techniques, image analysis of the front-side image and the back-side image to extract one or more payment instrument data elements, wherein at least one of the one or more payment instrument data elements identifies the financial account;
store the one or more payment instrument data elements in an electronic wallet associated with the user; and
provide, on behalf of the user, at least one of the one or more payment instrument data elements to initiate a financial transaction drawn on the financial account.

2. The financial system of claim 1, wherein the one or more processors are further configured to execute the computer-executable instructions to authenticate the user to: (i) create the electronic wallet associated with the user, or (ii) access the electronic wallet associated with the user, wherein the electronic wallet is pre-existing.

3. The financial system of claim 1, wherein the one or more processors are further configured to execute the computer-executable instructions to receive, on behalf of a user, a request to add or modify the payment instrument in the electronic wallet, wherein receiving the front-side image is associated with receiving the request.

4. The financial system of claim 1, wherein the one or more processors are further configured to execute the computer-executable instructions to transmit, for presentation to the user, instructions for providing the front-side image.

5. The financial system of claim 1, wherein the financial account comprises at least one of: (i) a demand deposit account; (ii) a credit card account; (iii) a debit card account; or (iv) a prepaid card account.

6. The financial system of claim 1, wherein the payment card comprises one of: (i) a credit card; (ii) a debit card; or (iii) a prepaid card.

7. The financial system of claim 1, wherein the front-side image comprises at least one of: (i) an image of a front of a credit card; (ii) an image of a front of a debit card; or (iii) an image of a front of a prepaid card.

8. The financial system of claim 1, wherein the one or more processors are further configured to execute the computer-executable instructions to:
transmit, for presentation to the user, an indication of at least one of the one or more payment instrument data elements; and
receive, on behalf of the user, at least one of: (i) a confirmation of the at least one of the one or more payment instrument data elements, or (ii) modification of one or more of the at least one of the one or more payment instrument data elements.

9. The financial system of claim 1, wherein the one or more image processing techniques comprise at least one of: (i) image filtering; (ii) image sharpening; (iii) modifying the orientation; (iv) modifying the dithering of one or more pixels; (v) modifying the contrast; (vi) modifying the brightness; (vii) processing metadata associated with the one or more images; (vii) image field recognition; (viii) text sequence recognition; (ix) optical character recognition; or (x) intelligent character recognition.

10. The financial system of claim 1, wherein the one or more payment instrument data elements comprise at least one of: (i) an identification of a payment instrument type; (ii) an identification of the financial account; (iii) an identification of a financial account number; (iv) an expiration date; (v) a card verification string; (vi) a card type; (vii) a card association; or (viii) a card issuer.

11. The financial system of claim 1, wherein at least one of the one or more payment instrument data elements is received on behalf of the user apart from the one or more images.

12. The financial system of claim 1, wherein the one or more processors are configured to store the one or more payment instrument data elements in the electronic wallet by executing the computer-executable instructions to at least one of: (i) create a new indication of the payment instrument in the electronic wallet, or (ii) update an existing indication of the payment instrument in the electronic wallet.

13. The financial system of claim 1, wherein the one or more processors are further configured to execute the computer-executable instructions to:
receive additional parameters associated with the payment instrument, wherein the additional parameters are associated with restrictions on the financial transaction; and
store the additional parameters in the electronic wallet.

14. The financial system of claim 13, wherein the restrictions on the financial transaction includes at least one of: (i) a spending limit per financial transaction; (ii) a total spending limit over a predefined period of time; or (iii) one or more merchants with which the financial transaction cannot be performed.

15. The financial system of claim 1, wherein the financial transaction comprises at least one of: (i) a bill payment; (ii) a person-to-person payment; (iii) an account-to-account funds transfer; or (iv) a retail purchase.

16. A method, comprising:
receiving, by a computerized financial system comprising one or more computers and on behalf of a user, a front-side image that represents at least a portion of a payment instrument associated with a financial account associated with the user;

analyzing, by the computerized financial system, the front-side image to determine one or more fields included in the front-side image;

determining, by the computerized financial system, a type of the payment instrument based at least in part on the one or more fields, wherein the type of the payment instrument is one of a check or a payment card;

in response to determining that the type of the payment instrument is a payment card, providing instructions for back-side image capture, in response to providing the instructions for back-side image capture, receiving a back-side image depicting a back side of the payment instrument, and performing, by the computerized financial system, using one or more image processing techniques, image analysis of the front-side image and the back-side image to extract one or more payment instrument data elements, wherein at least one of the one or more payment instrument data elements identifies the financial account;

storing, by the computerized financial system, the one or more payment instrument data elements in an electronic wallet associated with the user; and providing, by the computerized financial system and on behalf of the user, at least one of the one or more payment instrument data elements to initiate a financial transaction drawn on the financial account.

17. The method of claim 16, further comprising authenticating, by the computerized financial system, the user to: (i) create the electronic wallet associated with the user, or (ii) access the electronic wallet associated with the user, wherein the electronic wallet is pre-existing.

18. The method of claim 16, further comprising receiving, by the computerized financial system on behalf of a user, a request to add or modify the payment instrument in the electronic wallet, wherein receiving the front-side image is associated with receiving the request.

19. The method of claim 16, further comprising transmitting, by the computerized financial system for presentation to the user, instructions for providing the front-side image.

20. The method of claim 16, wherein the financial account comprises at least one of: (i) a demand deposit account; (ii) a credit card account; (iii) a debit card account; or (iv) a prepaid card account.

21. The method of claim 16, wherein payment card comprises one of: (i) a credit card; (ii) a debit card; or (iii) a prepaid card.

22. The method of claim 16, wherein the front-side image comprises at least one of: (i) an image of a front of a credit card; (ii) an image of a front of a debit card; or (iii) an image of a front of a prepaid card.

23. The method of claim 16, further comprising:

transmitting, by the computerized financial system for presentation to the user, an indication of at least one of the one or more payment instrument data elements; and receiving, by the computerized financial system and on behalf of the user, at least one of: (i) a confirmation of the at least one of the one or more payment instrument data elements, or (ii) modification of one or more of the at least one of the one or more payment instrument data elements.

24. The method of claim 16, wherein the one or more image processing techniques comprise at least one of: (i) image filtering; (ii) image sharpening; (iii) modifying the orientation; (iv) modifying the dithering of one or more pixels; (v) modifying the contrast; (vi) modifying the brightness; (vii) processing metadata associated with the one or more images; (vii) image field recognition; (viii) text sequence recognition; (ix) optical character recognition; or (x) intelligent character recognition.

25. The method of claim 16, wherein the one or more payment instrument data elements comprise at least one of: (i) an identification of a payment instrument type; (ii) an identification of the financial account; (iii) an identification of a financial account number; (iv) an expiration date; (v) a card verification string; (vi) a card type; (vii) a card association; or (viii) a card issuer.

26. The method of claim 16, wherein at least one of the one or more payment instrument data elements is received on behalf of the user apart from the one or more images.

27. The method of claim 16, wherein storing the one or more payment instrument data elements in the electronic wallet comprises at least one of: (i) creating a new indication of the payment instrument in the electronic wallet, or (ii) updating an existing indication of the payment instrument in the electronic wallet.

28. The method of claim 16, further comprising:

receiving, by the computerized financial system, additional parameters associated with the payment instrument, wherein the additional parameters are associated with restrictions on the financial transaction; and storing, by the financial system, the additional parameters in the electronic wallet.

29. The method of claim 28, wherein the restrictions on the financial transaction includes at least one of: (i) a spending limit per financial transaction; (ii) a total spending limit over a predefined period of time; or (iii) one or more merchants with which the financial transaction cannot be performed.

30. The method of claim 16, wherein the financial transaction comprises at least one of: (i) a bill payment; (ii) a person-to-person payment; (iii) an account-to-account funds transfer; or (iv) a retail purchase.

\* \* \* \* \*